United States Patent
Saitou

(10) Patent No.: US 8,356,033 B2
(45) Date of Patent: Jan. 15, 2013

(54) ALBUM SYSTEM, PHOTOGRAPHING DEVICE, AND SERVER

(75) Inventor: Kiichirou Saitou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/357,686

(22) Filed: Jan. 25, 2012

(65) Prior Publication Data

US 2012/0197886 A1 Aug. 2, 2012

(30) Foreign Application Priority Data

Jan. 31, 2011 (JP) .................................. 2011-018943

(51) Int. Cl.
*G06F 17/30* (2006.01)
(52) U.S. Cl. ......... 707/736; 707/758; 382/305; 709/218
(58) Field of Classification Search .................. 725/100, 725/109, 110, 112; 707/736, 758; 709/218, 709/219; 382/305; 715/200, 249
See application file for complete search history.

(56) References Cited

U.S. PATENT DOCUMENTS

| | | | |
|---|---|---|---|
| 5,640,193 A * | 6/1997 | Wellner .......................... | 725/100 |
| 7,970,854 B2 * | 6/2011 | Svendsen et al. .............. | 709/217 |
| 2003/0083948 A1 * | 5/2003 | Rodriguez et al. .............. | 705/26 |
| 2004/0207657 A1 * | 10/2004 | Svendsen ....................... | 345/738 |
| 2005/0261990 A1 * | 11/2005 | Gocht et al. .................... | 705/27 |
| 2006/0158463 A1 * | 7/2006 | Michlin ......................... | 345/634 |
| 2007/0094076 A1 * | 4/2007 | Perkowski et al. ............. | 705/14 |
| 2007/0094263 A1 * | 4/2007 | Tessman et al. ................. | 707/9 |
| 2009/0100096 A1 * | 4/2009 | Erlichson et al. .......... | 707/104.1 |
| 2009/0307314 A1 * | 12/2009 | Smith et al. ................... | 709/206 |
| 2010/0066839 A1 * | 3/2010 | Azuma et al. .............. | 348/207.1 |
| 2010/0205221 A1 * | 8/2010 | Shaw et al. .................... | 707/802 |
| 2010/0278381 A1 * | 11/2010 | Tessman et al. .............. | 382/100 |

FOREIGN PATENT DOCUMENTS

| | | |
|---|---|---|
| JP | 2004-112360 | 4/2004 |
| JP | 2009-020862 | 1/2009 |

* cited by examiner

*Primary Examiner* — Jean M Corrielus
(74) *Attorney, Agent, or Firm* — IPUSA, PLLC

(57) ABSTRACT

A photographing device is arranged to communicate with a server via a network. In the photographing device, an information uploading unit transmits a user identifier and image data to the server. An image information storing unit receives a data identifier from the server, associates the image data with the data identifier, and stores the image data in a non-volatile memory or a removable non-volatile memory of the photographing device. A URL information generating unit generates URL information of a web page containing the data identifier and requesting the server to manipulate management information of the image data. An encoding unit encodes the URL information into a bar code. A display unit displays an image of the bar code on a display.

9 Claims, 23 Drawing Sheets

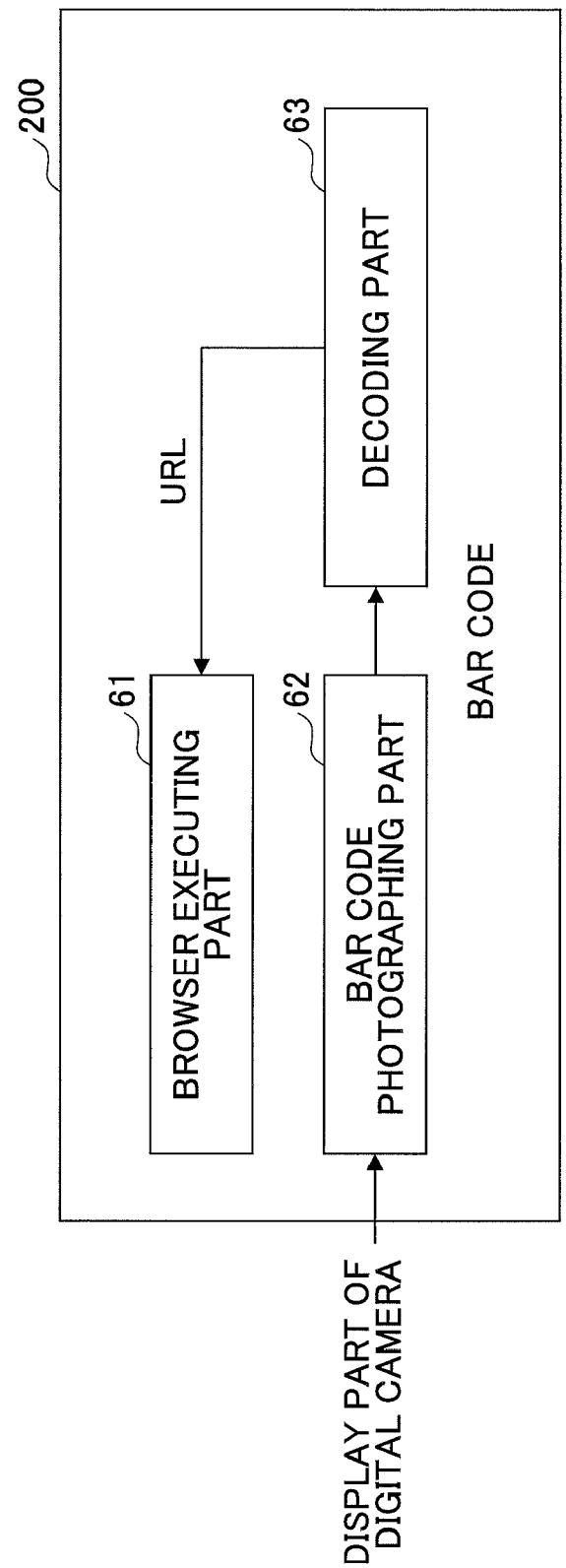

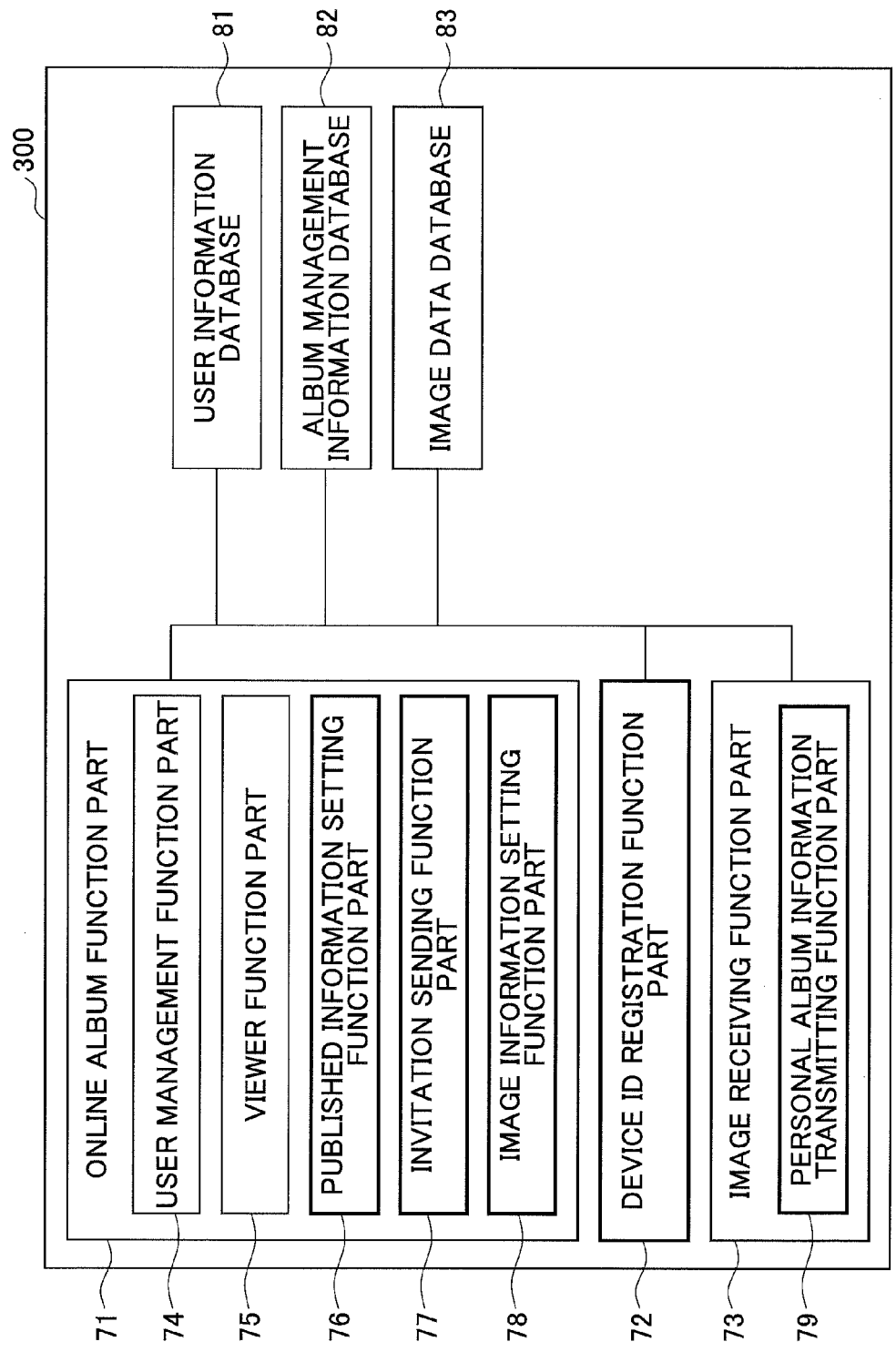

FIG.9

ALBUM ○○　DEVICE REGISTRATION　AUTHENTICATION SCREEN
https://oo.oo/register/auth

REGISTERED USER NAME
jklmnop　～101

PASSWORD
***************　～102

LOGIN　～103

↓

ALBUM ○○　DEVICE REGISTRATION SCREEN
https://oo.oo/register/reg

PLEASE INPUT UPLOADING DEVICE ID OF DEVICE WHICH
UPLOADS AN IMAGE TO "○○ ALBUM"　～105

UPLOADING DEVICE ID
| 00 | 11 | 22 | 33 | 44 | 55 | 66 | 77 | ～106

CONFIRMATION SCREEN　～107

↓

ALBUM ○○　DEVICE REGISTRATION　CONFIRMATION SCREEN
https://oo.oo/register/confirm

FOLLOWING INFORMATION WILL BE REGISTERED.　～108
PLEASE PRESS REGISTER BUTTON IF NO CORRECTION IS NEEDED.
PLEASE PRESS CORRECT BUTTON IF CORRECTION IS NEEDED.

| REGISTERED USER NAME | jklmnop |
|---|---|
| DEVICE ID | 00-11-22-33-44-55-66-77 |

～109

REGISTER　CORRECT
　～110　　～111

| USER ID | REGISTERED USER NAME | PASSWORD | DEVICE ID |
|---|---|---|---|
| 0x0001E240 | jllmop | 123456789 | 11-22-33-44-55-66-77 |

~81

(b)

| USER ID | ALBUM ID | ALBUM NAME | ALBUM SITE ID | ALBUM SITE ATTRIBUTE |
|---|---|---|---|---|
| 0x0001E240 | 0x0001E240-001 | 20101101 | oo.oo | NON-PUBLISHED |

~82

(c)

| DATA ID | ALBUM ID | TITLE | TAG | ATTRIBUTE | DATE OF REGISTRATION |
|---|---|---|---|---|---|
| 001 | 0x0001E240-001 | 20101205-001 | NONE | NON-PUBLISHED | 20101205 |

| NO. | NAME | EXAMPLE OF DATA |
|---|---|---|
| 1 | ATTRIBUTE | 0x00000001 (UPLOADED DATA) |
| 2 | USER ID | 0x0001E240 |
| 3 | ALBUM ID | 0x0003 |
| 4 | ALBUM NAME | 20101101 |
| 5 | DATA ID IS RETURNED | 0x0005 |
| 6 | ALBUM SITE ID | "oo.oo" |
| 7 | ALBUM SITE ATTRIBUTE | 0x00000000 |

FIG.17

| COMMAND ID | COMMAND | NAME | CONTENT |
|---|---|---|---|
| 1 | edit | IMAGE INFO. EDITING | TO ALTER TITLE, TAG, ALBUM, OR ALBUM NAME OF IMAGE DATA |
| 2 | acl | PUBLICATION SETTING | TO SET RANGE OF PUBLICATION OF IMAGE DATA |
| 3 | inv | INVITATION SENDING | TO SEND INVITATION TO IMAGE DATA BY E-MAIL |
| 4 | edit_a | ALBUM INFO. EDITING | TO ALTER ALBUM NAME OR ALBUM ATTRIBUTE OF ALBUM INCLUDING IMAGE DATA |
| 5 | inv_a | ALBUM INVITATION SENDING | TO SEND INVITATION TO ALBUM INCLUDING IMAGE DATA |
| 6 | delete | IMAGE DELETION | TO DELETE IMAGE DATA |

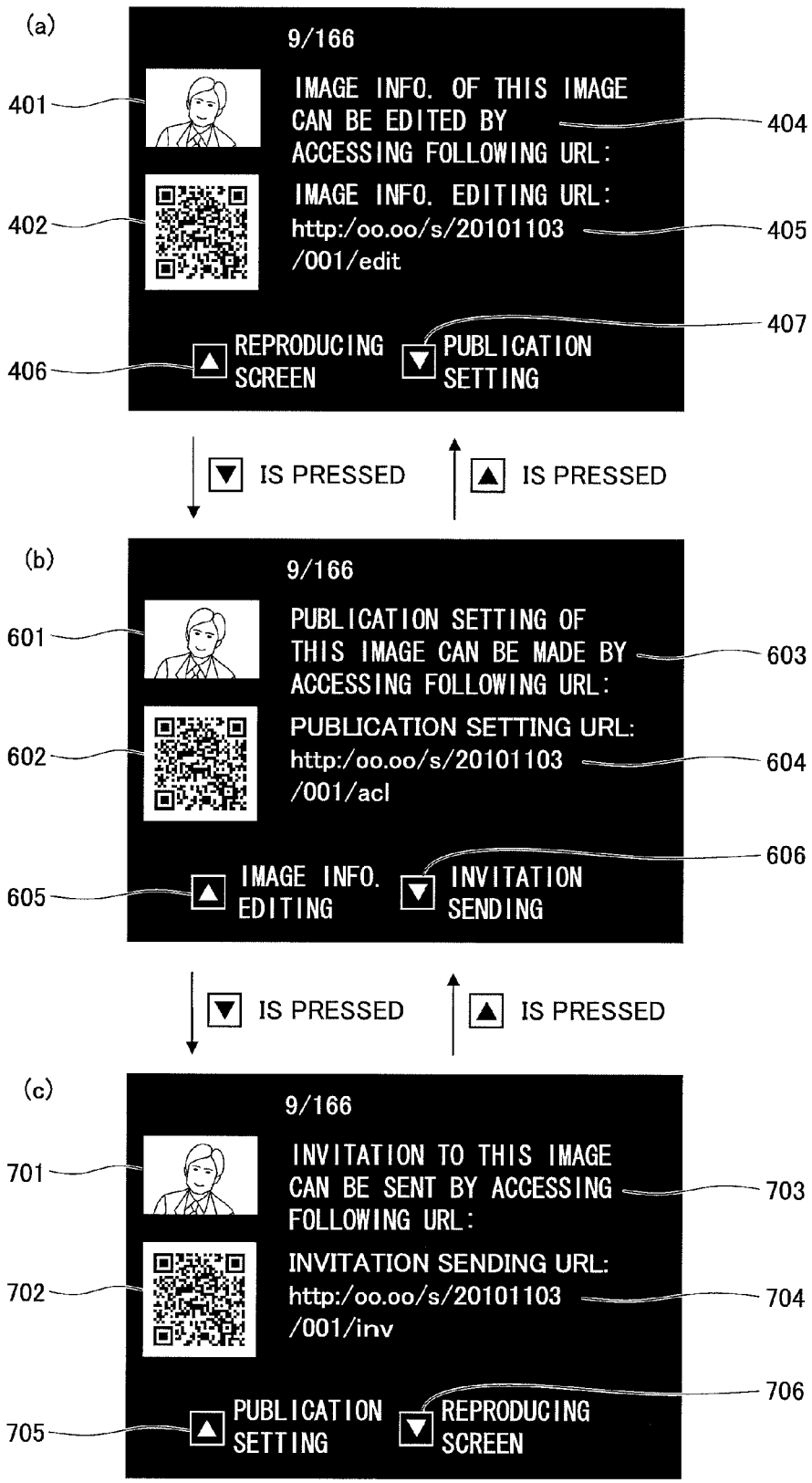

FIG.22
(a)
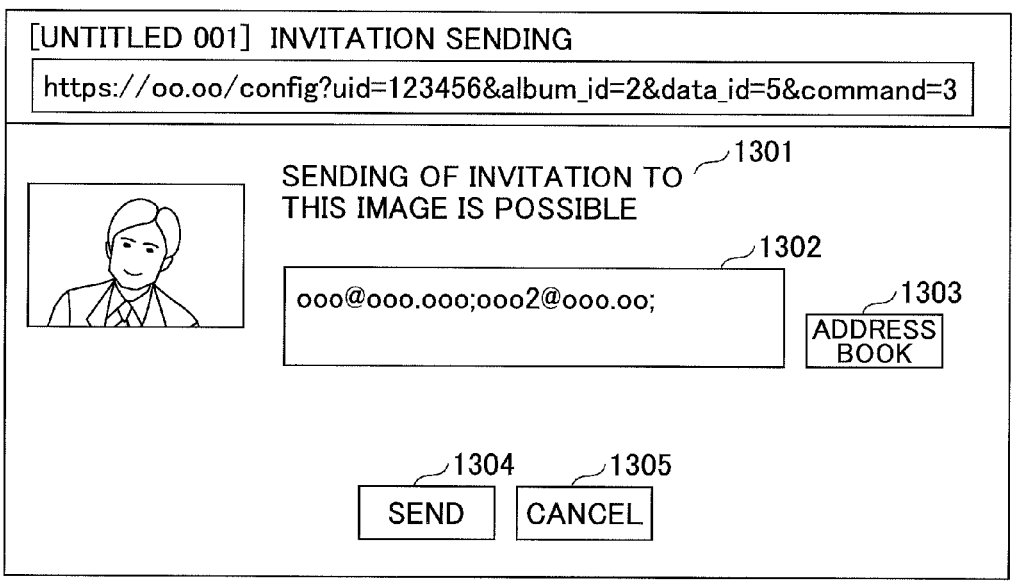
(b)
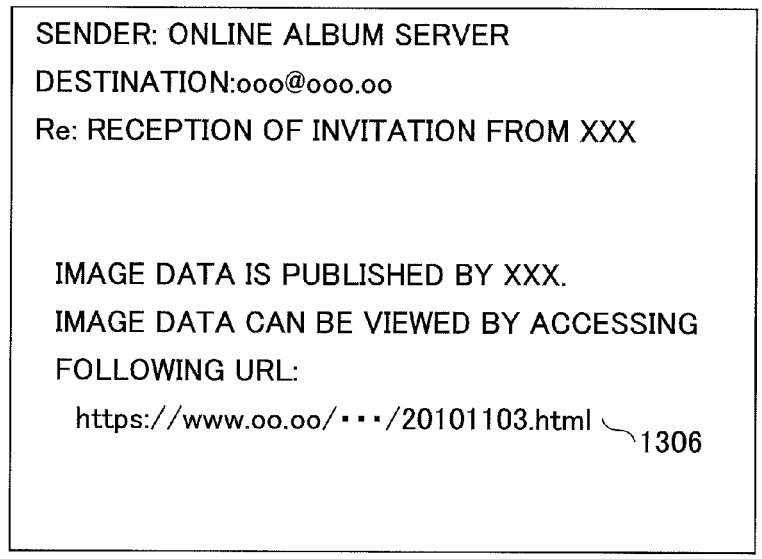

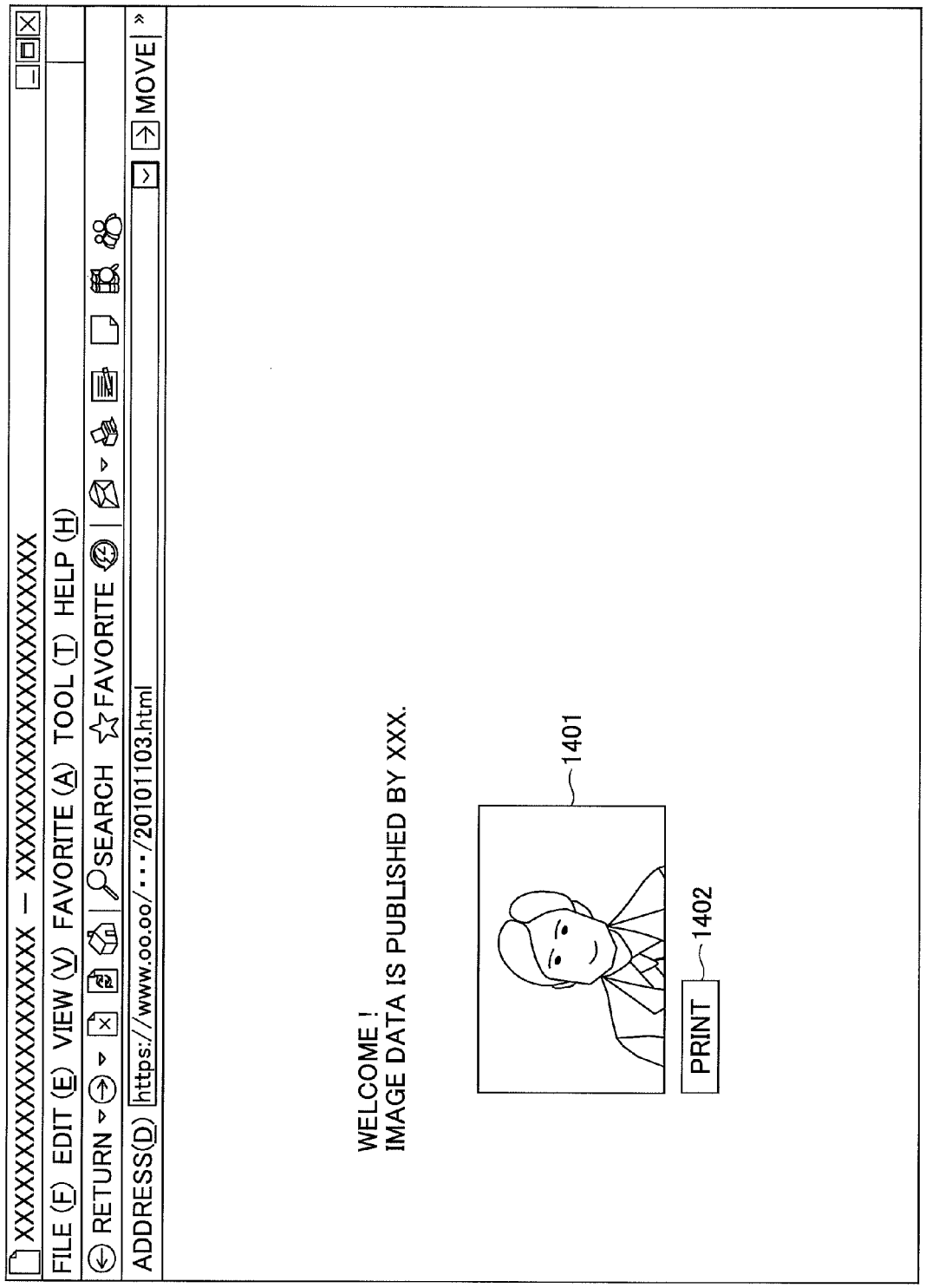

ALBUM SYSTEM, PHOTOGRAPHING DEVICE, AND SERVER

BACKGROUND OF THE INVENTION

1. Field of the Invention

The present disclosure generally relates to an album system in which a server stores image data from a photographing device, and more particularly to a photographing device which enables a user on the photographing device to deal with image data stored in a server in an album system.

2. Description of the Related Art

There is known a photographic image management method which allows an administrator to manage photographic images, captured by a digital still camera or a digital video camera (which will be referred to as a digital camera) and stored in a PC (personal computer), and to upload his own captured photographic images to a homepage for publishing the photographic images. By using such a method, the administrator may also be allowed to utilize an online album service provided on the Internet gratuitously or onerously, in order to show the stored photographic images to his friends at a remote place where he visits, or to use them for documentation.

Generally, when an administrator uploads a photographic image to an online album service, a digital camera is connected to a PC and the photographic image is copied to the PC, or a memory card is attached to the PC and then the photographic image is uploaded to the online album service via the PC.

However, in order to upload a photographic image to the online album service, it is necessary for the administrator to copy the photographic image from the digital camera to the PC. This may become a complicated task. Hence, an imaging device adapted for reducing the burden of the copying operation is proposed. For example, see Japanese Laid-Open Patent Publication No. 2009-020862.

In the imaging device disclosed in Japanese Laid-Open Patent Publication No. 2009-020862, the administrator manipulates the PC to display an image containing a two-dimensional bar code indicating a URL of an upload address on a web page of the online album service. The image of the URL is captured by using the digital camera and the captured image of the bar code is decoded to identify the URL. Thereby, the administrator is allowed to transmit a photographic image to the online album service in the network at the address specified by the URL. It is no longer necessary to copy the photographic image from the digital camera to the PC.

However, in the imaging device disclosed in Japanese Laid-Open Patent Publication No. 2009-020862, the administrator has to operate the PC, different from the digital camera, in order to access the web site of the online album service and display the image of the two-dimensional bar code of the URL on the PC in advance. There is a problem in that the administrator's burden within the uploading operation is not adequately reduced.

In the meantime, in order to raise the convenience of the digital camera, an improved digital camera or memory card which incorporates a wireless communication function has been marketed. This digital camera can be connected from a wireless LAN network, such as Wi-Fi, to a WWW network, and can upload a photographic image directly from the digital camera to the online album service the URL of which is stored beforehand in the digital camera or memory card.

One of the marketed memory cards having the wireless communication function is provided with a Wi-Fi communication function. When the memory card is in a state in which the Wi-Fi connection is activated, the memory card automatically uploads a photographic image to the predetermined online album service. Therefore, the administrator can easily upload a photographic image to the online album service via a public wireless LAN without using the PC.

However, the uploading function according to the related art can provide only the minimum capability for the administrator, such as a capability to enable the administrator to select the data to be uploaded. The uploading function according to the related art does not provide sufficient capabilities for the administrator. For example, in a case in which the administrator desires to edit management information, such as a title of a photographic image, the administrator cannot edit the management information by using the uploading function according to the related art.

SUMMARY OF THE INVENTION

In one aspect, the present disclosure provides a photographing device which is capable of easily uploading a photographic image to an online album server in an album system by using a wireless communication function and is capable of easily setting up management information of the photographic image.

In an embodiment which solves or reduces one or more of the above-mentioned problems, the present disclosure provides an album system including: a server; and a photographing device which transmits image data to the server via a network, the server including: an image data storing unit; a user information storing unit configured to store a user identifier to identify a user; an image-data receiving unit configured to identify the user by the user identifier received from the photographing device, associate image data received from the photographing device with the user identifier, and store the image data in the image data storing unit; and a data transmitting unit configured to assign a data identifier to identify the image data to the image data stored in the image data storing unit and transmit the data identifier to the photographing device, the photographing device including: an information uploading unit configured to transmit the user identifier and the image data to the server; an image information storing unit configured to receive the data identifier from the server, associate the image data with the data identifier, and store the image data in a non-volatile memory or a removable non-volatile memory of the photographing device; a URL information generating unit configured to generate URL information of a web page containing the data identifier for requesting the server to edit management information of the image data; an encoding unit configured to encode the URL information into a bar code; and a display unit configured to display an image of the bar code on a display.

Other objects, features and advantages of the present disclosure will become more apparent from the following detailed description when read in conjunction with the accompanying drawings.

BRIEF DESCRIPTION OF THE DRAWINGS

FIG. 7 is a diagram showing the functional composition of software performed by a CPU of the mobile phone.

FIG. 8 is a diagram showing the functional composition of software performed by a CPU of the OLAS.

FIG. 9 is a diagram for explaining association of a user and the digital camera stored by a device ID registration function part of the OLAS.

FIG. 10 is a diagram showing examples of a user information database, an album management information database, and an image data database.

FIG. 12 is a diagram showing an example of personal album information.

FIG. 17 is a diagram showing an example of a correspondence table of a command ID, a command, and the content of manipulation.

FIG. 18 is a diagram for explaining operation of a user to select a command (URL).

FIG. 22 is a diagram showing an example of a web page image displayed based on the screen information transmitted by an invitation sending function part of the OLAS.

FIG. 23 is a diagram showing an example of a web page image displayed by a browser of a PC which is operated by an invited person.

DETAILED DESCRIPTION OF THE PREFERRED EMBODIMENTS

A description will be assigned of embodiments of the present disclosure with reference to the accompanying drawings.

Figure 1:
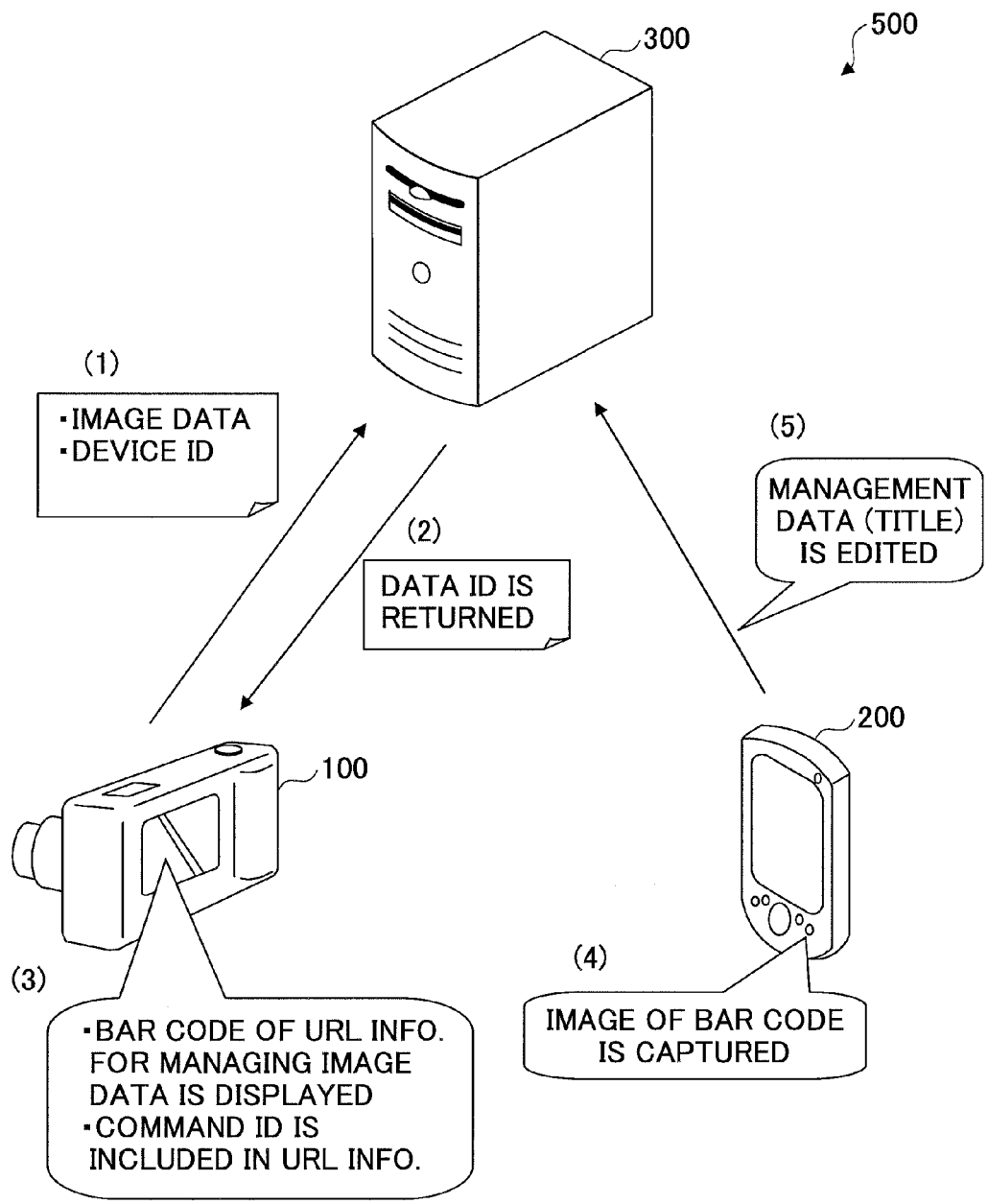
FIG. 1 is a diagram for explaining the fundamental function of an album system of an embodiment of the present disclosure.

FIG. 1 is a diagram for explaining the fundamental function of an album system 500 of an embodiment of the present disclosure. As shown in FIG. 1, in the album system 500 of this embodiment, once image data captured by a digital camera 100 is uploaded to an online album server 300, an administrator (or a user) with respect to the image data is allowed to easily edit management information of the image data.

(1) The digital camera 100 uploads the captured image data and a device ID for identifying the user to the online album server 300.

(2) The online album server 300 assigns a data ID to the image data and transmits the data ID to the digital camera 100.

(3) The digital camera 100 specifies the image data by the data ID, generates URL information for editing management information of the image data, and displays the URL in the form of a bar code.

(4) The mobile phone 200 captures an image of the bar code.

(5) The mobile phone 200 accesses the URL which is obtained by decoding the bar code and the user can edit the management information of the uploaded image data.

In this manner, the user is allowed to access the server 300 using the mobile phone 200, without inputting the URL of the online album server 300, and is allowed to perform various manipulations to the management information of the image data.

In the step (3), the digital camera 100 may include a command ID in the URL information. This command ID includes information for identifying one of the various manipulations to the management information. The management information contains, for example, information for managing image data, such as a title of the image data, an album name of the album to which the image data belongs, a publication attribute, and distribution destination information. The manipulation to the management information is, for example, setting of the management information, modification of the management information, etc.

Because the content of the manipulation is specified by the command ID, the user is allowed to perform the desired manipulation to the management information in the web page directly, without searching around the hierarchical data of the web page after the online album server is accessed.

Figure 2:
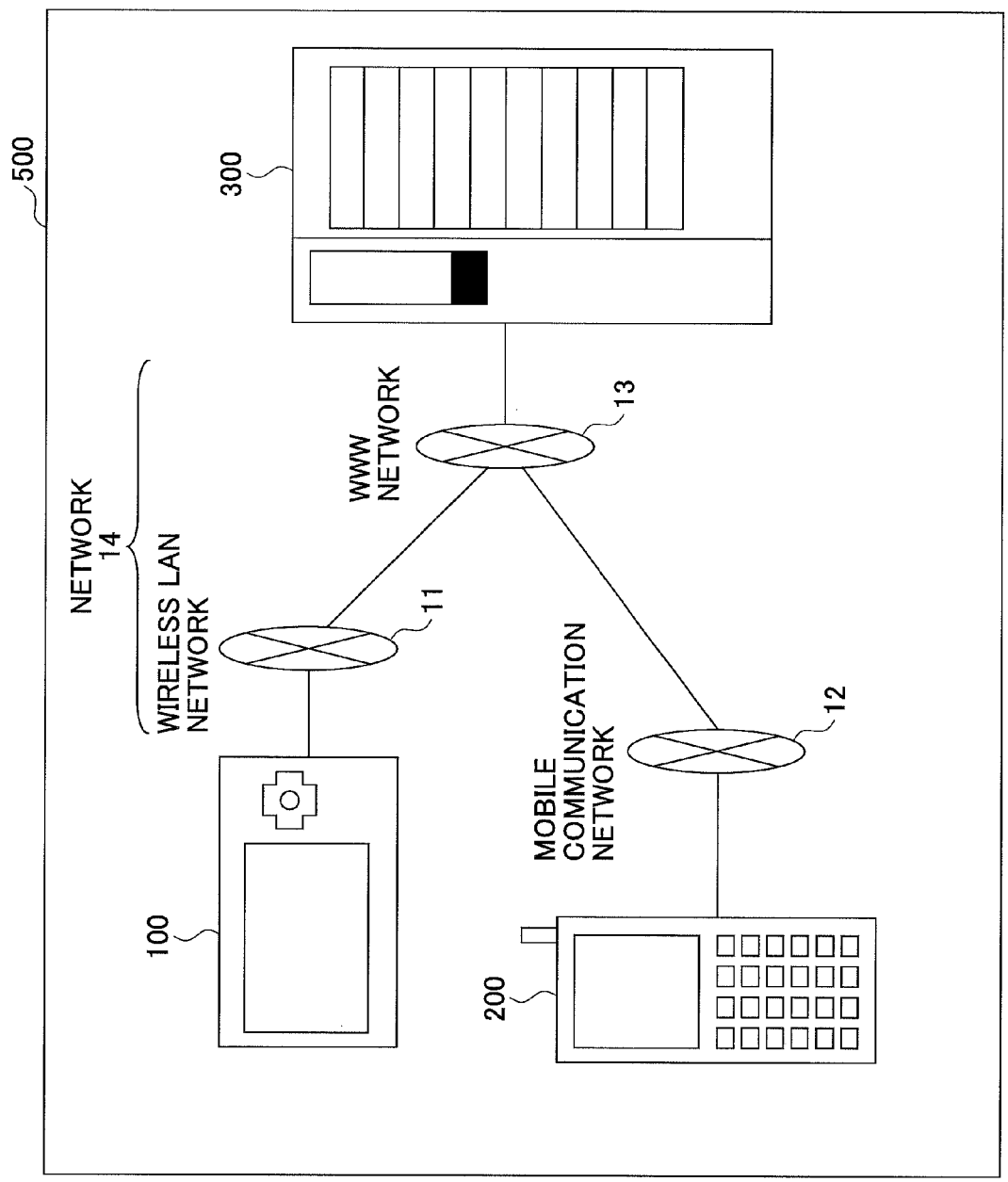
FIG. 2 is a diagram showing the outline composition of the album system of the present embodiment.

FIG. 2 is a diagram showing the outline composition of the album system 500. As shown in FIG. 2, in the album system 500, a digital camera 100, a mobile phone 200, and an online album server (OLAS) 300 are connected together via a network 14. The digital camera 100 is connected to a WWW (world wide web) network 13 via a wireless LAN network 11. The mobile phone 200 is connected to the WWW network 13 via a mobile communication network 12. The OLAS 300 is connected to the WWW network 13. In FIG. 2, the illustration of a gateway device, a router, a firewall, etc. is omitted for the sake of convenience.

In the present embodiment, the network 14 is composed of the wireless LAN network 11, the mobile communication network 12, and the WWW network 13. Alternatively, a WiMAX network, a PHS network, etc. may be included instead of the wireless LAN network 11 and the mobile communication network 12. Alternatively, a WiMAX network, a PHS network, etc. may be included in addition to the wireless LAN network 11 and the mobile communication network 12. Alternatively, the mobile phone 200 may be connected to the WWW network 13 via the wireless LAN network 11, and the digital camera 100 may be connected to the WWW network 13 via the mobile communication network 12.

The digital camera 100 is arranged to communicate with an access point of the wireless LAN network 11. There are many devices which incorporate the digital camera 100, such as devices incorporating a digital video camera or a digital still camera. Such devices will be collectively called the digital camera 100. Alternatively, any of a mobile phone, a smart phone, and a notebook PC (personal computer) provided with a digital camera function may be treated as the digital camera 100 in the album system of FIG. 2.

The mobile phone 200 is arranged to include a camera function for reading a two-dimensional bar code, a displaying function for displaying an image of the read URL, and a web browser function for setting up information transmitted to the OLAS 300. Each of these functions is normally provided in an intelligent-terminal-type information processing device. Hence, the mobile phone 200 may be replaced by any of a smart phone, a PHS (personal handy phone), a WiMAX terminal, and a notebook PC provided with a communication function.

The OLAS 300 is a server provided with a WWW server (Web server) function, and software of the online album function is introduced into the OLAS 300. An IP address of the OLAS 300 is registered in a DNS server.

The digital camera 100 uses the network standards IEEE 802.11a/g/b as a protocol of a MAC layer. The digital camera 100 communicates with the OLAS 300 according to a network protocol of TCP/IP using an IP address assigned from an access point. For example, the digital camera 100 communicates with the OLAS 300 using one of a hypertext transfer protocol (HTTP), a file transfer protocol (FTP), a Telnet protocol, etc.

The mobile phone 200 communicates with a base station of the mobile communication network 12 using a communication protocol of any of the standards of PDC, GSM, CDMA, etc. The mobile phone 200 communicates with the OLAS 300 using an IP address assigned from a carrier of the mobile phone 200. The communication protocol may be suitably changed by a gateway device.

Figure 3:
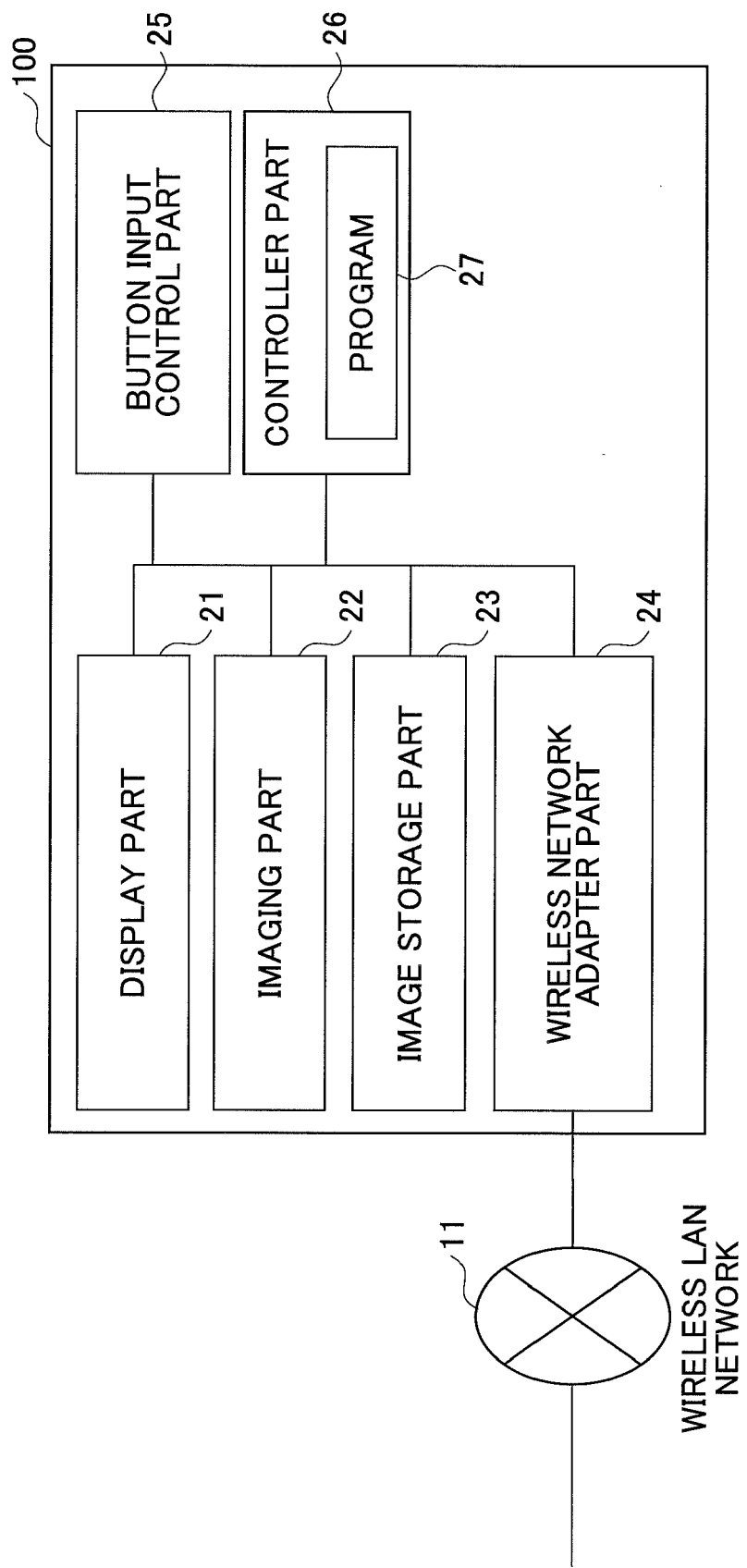
FIG. 3 is a diagram showing the hardware composition of a digital camera.

FIG. 3 is a diagram showing the hardware composition of the digital camera 100. As shown in FIG. 3, the digital camera 100 is arranged to include a display part 21, an imaging part 22, an image storage part 23, a wireless network adapter part 24, a button input control part 25, and a controller part 26.

The display part 21 includes a display panel, such as a liquid crystal panel or an organic EL (electroluminescence) panel, and a display control part. When an image is to be captured by the digital camera 100, the display part 21 functions as a viewfinder. The display part 21 functions as a display device which displays the captured image. Further, the display part 21 functions as a guidance providing device which displays guidance information (an operation menu, a message, etc.) for explaining an operating method of the digital camera 100. In order to provide guidance information of the operating method, the display part 21 includes an onscreen controller which generates various graphic images and characters for a user interface and displays them on the display panel. In the following, the difference between the display panel and the display part 21 will be disregarded and both will be referred to as the display part 21.

The imaging part 22 includes an imaging sensor and a peripheral circuit which converts an output of the imaging sensor into digital data and performs image processing. The imaging sensor mainly includes optical system parts (which include a lens, a lens drive motor, an iris diaphragm, etc.), a CCD (which may be another photoelectric transducer, such as a CMOS), a CCD drive circuit, and an AD converter. The peripheral circuit controls CCD drive timing of the imaging sensor, zooming and focusing by using the lens drive motor, and exposure adjustment. The peripheral circuit includes a digital signal processor (DSP) for image processing to perform compression and decompression of an image, and a frame memory. The peripheral circuit may perform processing to convert image data into an image signal appropriate for displaying an image (for example, RGB→YUV, YUV→PAL or NTSC).

The image storage part 23 includes a built-in non-volatile memory, such as an NAND flash memory. The image storage part 23 stores image data of each captured image, and its photographing condition (including a photographing date, a kind of camera, an exposure value, and a shutter speed) in the format of EXIF (exchangeable image file format) or the like. The image storage part 23 may include a built-in non-volatile memory, and a removable, portable non-volatile memory (for example, a flash memory card).

The wireless network adapter part 24 communicates with an access point by the communication of the MAC layer according to the IEEE 802.11a/g/b. The wireless network adapter part 24 performs communication processing based on a protocol stack of TCP/IP or a higher-order HTTP protocol. Hence, the digital camera 100 is connectable to the WWW network 13 by using the wireless network adapter part 24. In a case in which the image storage part 23 includes a removable non-volatile memory, the wireless network adapter part 24 may be built in the non-volatile memory.

The button input control part 25 is arranged to receive a hard-key operation of the digital camera 100 which is input by a user, and to notify the user's input operational information to the controller part 26 or the onscreen display controller. The button input control part 25 is arranged to control shut-off and restart of a power supply to the controller part 26.

The controller part 26 is connected to each of the display part 21, the image storage part 23, the imaging part 22, the wireless network adapter part 24 and the button input control part 25, and controls operation of the whole digital camera 100. The controller part 26 includes a CPU, a flash memory in which a program 27 is stored, and a RAM. The CPU executes the program 27 read from the flash memory and loaded to the RAM, and controls acquisition of personal album information by uploading of a captured image and playback of the personal album information, which will be described later. The program 27 may be distributed via a storage medium (not illustrated) or via the network 14.

Figure 4:
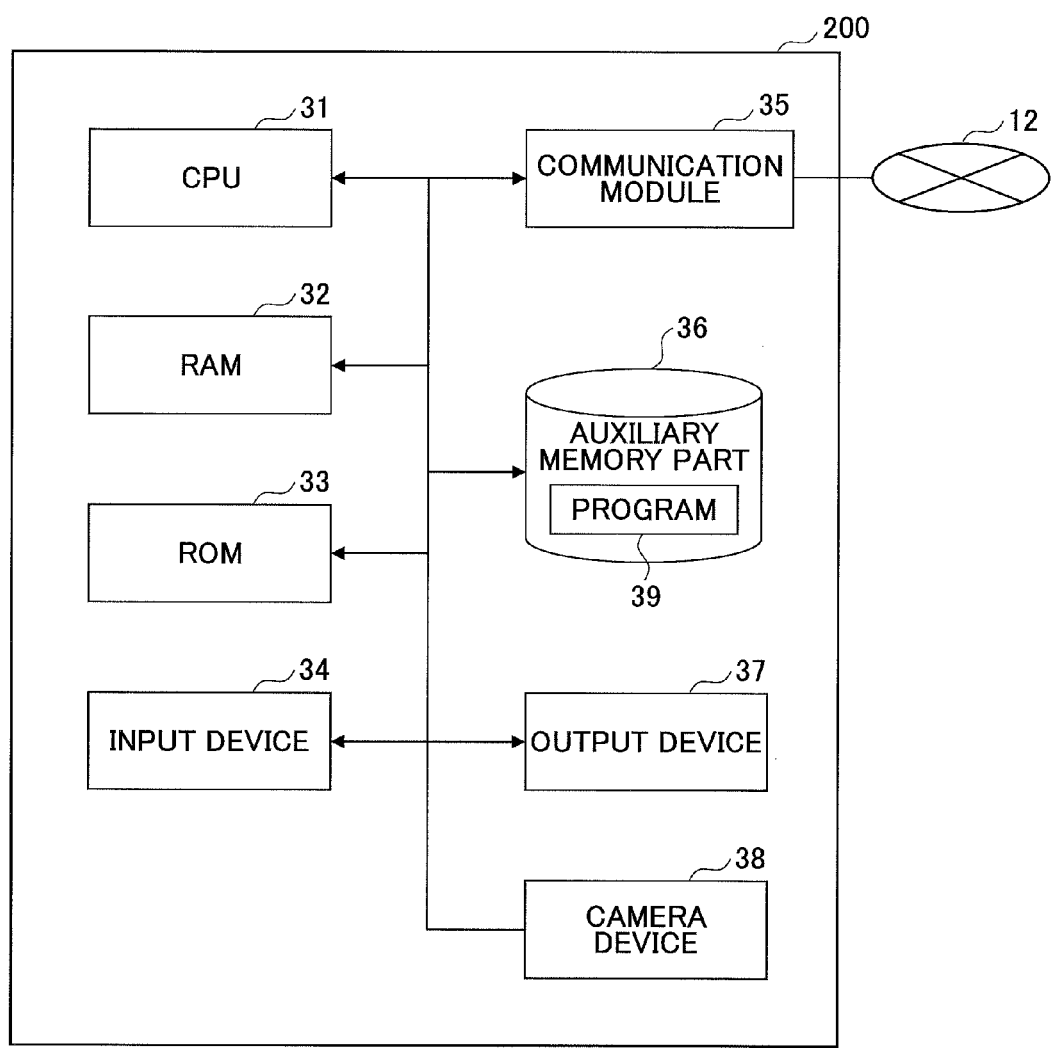
FIG. 4 is a diagram showing the hardware composition of a mobile phone.

FIG. 4 is a diagram showing the hardware composition of the mobile phone 200.

As shown in FIG. 4, the mobile phone 200 is arranged to include a CPU 31, a RAM 32 and a ROM 33 which constitute a main storage device, a communication module 35 which controls communication, an auxiliary memory part 36, such as a flash memory card, an input device 34, such as a manual operation button, an output device 37, such as an LCD or an organic EL display, and a camera device 38.

Each of functions of the mobile phone 200 which will be described below is performed by the CPU 31 executing a program 39 read from the auxiliary memory part 36 and loaded to the work memory of the RAM 32. The program 39 contains at least browser software. By using the program 39, a user is allowed to input data which is to be transmitted to the OLAS 300. It is preferred that the mobile phone 200 is provided with a position measuring function according to the GNSS (global navigation satellite system) or a wireless-field-intensity positioning method.

Figure 5:
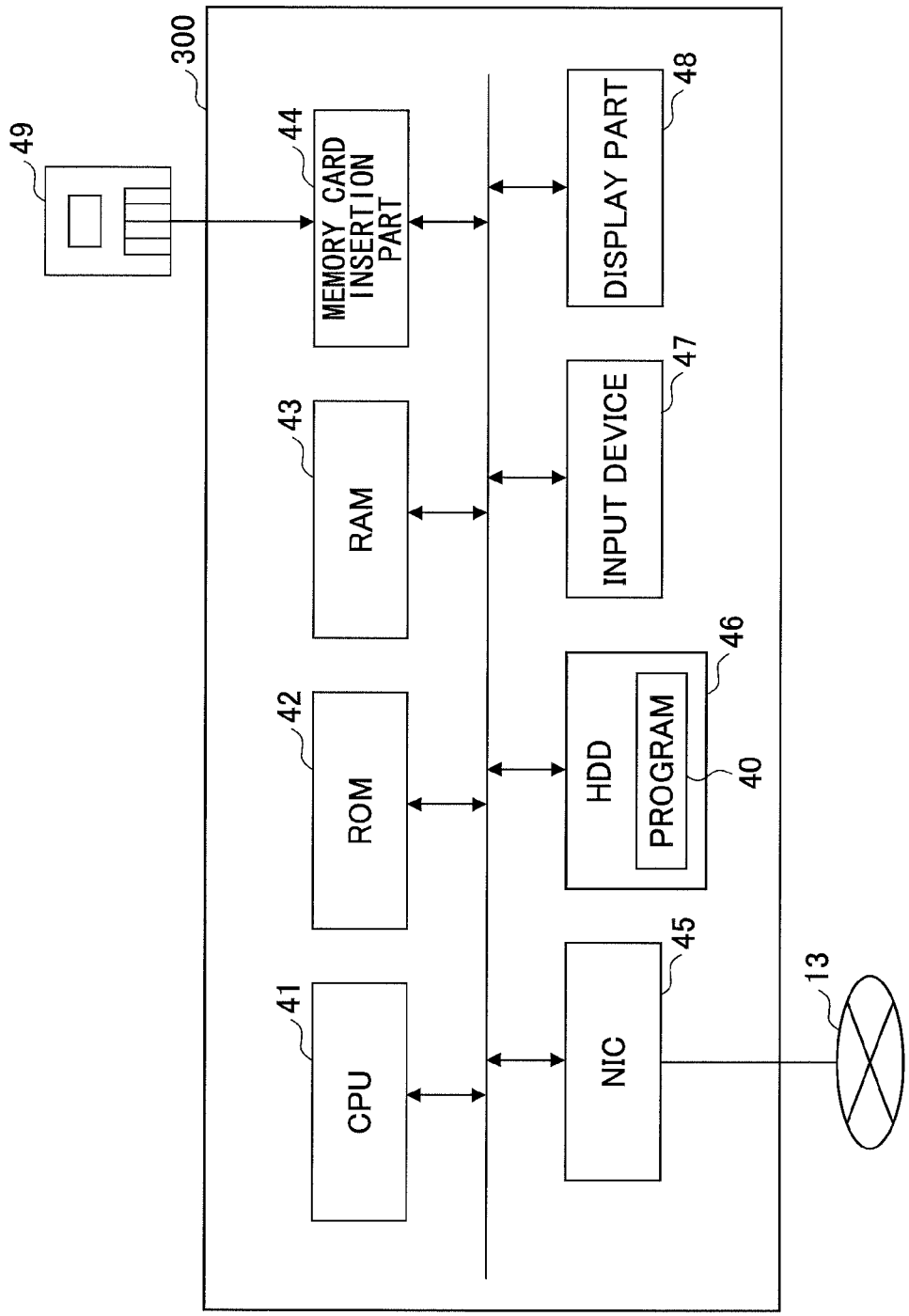
FIG. 5 is a diagram showing the hardware composition of an online album server (OLAS).

FIG. 5 is a diagram showing the hardware composition of the OLAS 300.

As shown in FIG. 5, the OLAS 300 is arranged to include a CPU 41, a ROM 42, a RAM 43, a memory card insertion part 44, a NIC (network interface card) 45, a HDD (hard disk drive) 46, an input device 47, and a display part 48.

The CPU 41 executes a program 40 stored in the HDD 46 and controls operation of the whole OLAS 300. A program needed for starting of the OLAS 300, such as BIOS, and setup information are stored in the ROM 42. The RAM 43 is a work memory for the CPU 41 to execute the program 40. The memory card insertion part 44 controls reading or writing (recording) of data from or to the memory card 49, such as a flash memory card. The program 40 is distributed in the state stored in the memory card 49, or via the WWW network 13.

The NIC 45 is a communication device for establishing connection of the layer 2 to the WWW network 13 and performing a data communication to the digital camera 100 or the mobile phone 200. The TCP/IP protocol stack and an application program take charge of processing required for a protocol of a higher order than the layer 2. The HDD 46 is a non-volatile memory device for storing the program 40, the OS (operating system), and image data. The HDD 46 may be an SSD (solid state drive). The input device 47 includes a keyboard and a mouse which constitute a user interface (UI) for allowing a user to operate the OLAS 300. The display part 48 is a flat-panel display, such as a liquid crystal display. For example, the display part 48 is used to display an operation menu and an operation result on the basis of a GUI (graphical user interface).

Figure 6:
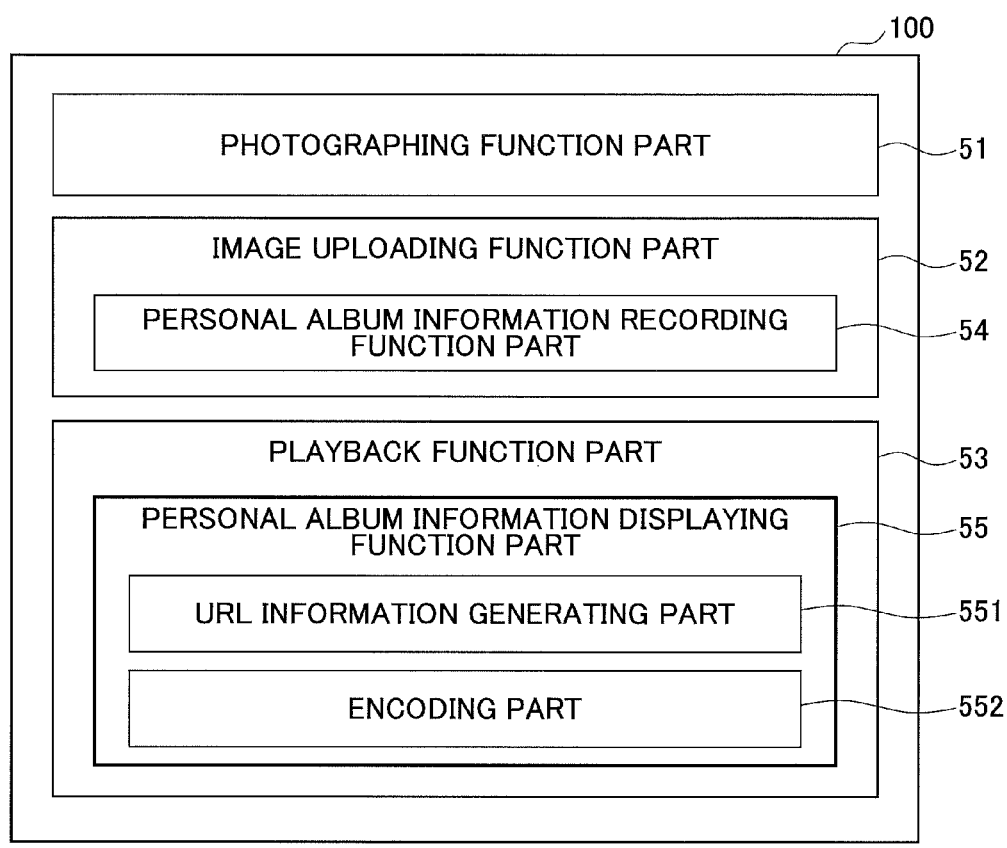
FIG. 6 is a diagram showing the functional composition of software performed by a controller part of the digital camera.

FIG. 6 is a diagram showing the functional composition of software performed by the controller part 26 of the digital camera 100. The digital camera 100 shown in FIG. 6 is equivalent to an embodiment of the photographing device of the present disclosure.

As shown in FIG. 6, the digital camera 100 is arranged to include a photographing function part 51, an image uploading function part 52, and a playback function part 53. The image uploading function part 52 includes a personal album information recording function part 54. The playback function part 53 includes a personal album information displaying function part 55.

In response to a user's button operation (depressing operation of a release button) which is received by the button input control part 25, the photographing function part 51 captures an image of image data and stores the image in the image storage part 23. When the user presses the release button halfway, the photographing function part 51 performs focusing. When the user presses the release button completely, the imaging part 21 captures an image of image data and stores the image in the image storage part 23 in a predetermined format, such as JPEG.

The image uploading function part 52 is mainly constituted by the wireless network adapter part 24 and the image storage part 23. When the access point of the wireless LAN network 11 is detected, the image uploading function part 52 transmits the image data to the URL of the OLAS 300 which is stored beforehand. The user operates the button input control part 25 in advance, so that the URL of the OLAS 300 is stored beforehand in the image storage part 23, such as the non-volatile memory.

The personal album information recording function part 54 obtains management information (or part of the management information) of the image data uploaded from the digital camera 100 to the OLAS 300 by the image uploading function, and records the acquired information in a header (for example, a predetermined region in the EXIF) of the image data stored in the image storage part 23 of the digital camera 100 as personal album information. In this case, the storage location of the personal album information is not restricted to the header of the image data. Alternatively, the image data may be associated with a predetermined region of the image storage part 23 and may be stored in the predetermined region. The personal album information will be described below (FIG. 12).

The playback function part 53 selects the image data captured by the photographing function according to a user's button operation and displays an image of the selected image data on the display part 21. The personal album information displaying function part 55 includes a URL information generating part 551 and an encoding part 552.

The URL information generating part 551 generates URL information based on the personal album information recorded by the personal album information recording function part 54. The encoding part 552 encodes the URL information into a two-dimensional bar code (or a one-dimensional bar code), and displays an image of the bar code on the display part 21. Hence, the mobile phone 200 can acquire the URL information by photographing the display part 21 of the digital camera 100.

FIG. 7 is a diagram showing the functional composition of software performed by the CPU 31 of the mobile phone 200.

As shown in FIG. 7, the mobile phone 200 is arranged to include a browser executing part 61, a bar code photographing part 62, and a decoding part 63. These function parts of the mobile phone 200 are constituted by the CPU 31 performing the software stored in the auxiliary memory part 36. The browser executing part 61 performs protocol processing, such as HTTP processing, and processing to interpret screen information described in the HTML or the like, and displays the screen information on the output device 37. The bar code photographing part 62 captures an image of the display part 21 of the digital camera 100 using the camera device 38. The decoding part 63 decodes the two-dimensional bar code which is captured by the bar code photographing part 62, and reconstructs the URL information from the bar code.

FIG. 8 is a diagram showing the functional composition of software performed by the CPU 41 of the OLAS 300.

As shown in FIG. 8, the OLAS 300 is arranged to include an online album function part 71, a device ID registration function part 72, and an image receiving function part 73. These function parts of the OLAS 300 are constituted by the CPU 41 performing the software stored in the HDD 46.

The online album function part 71 includes a user management function part 74, a viewer function part 75, a published information setting function part 76, an invitation sending function part 77, and an image information setting function part 78. The image receiving function part 73 includes a personal album information transmitting function part 79.

The OLAS 300 includes a user information database 81, an album management information database 82, and an image data database 83 which are stored in the HDD 46. The three databases 81-83 are illustrated for the sake of convenience of description. Alternatively, the databases may be formed into one or two databases. The management information according to the present disclosure is information registered in the user information database 81, the album management information database 82, and the image data database 83.

The device ID registration function part 72 provides a function to associate a user of the OLAS 300 and the digital camera 100 and register user information of the user and a device ID intrinsic to the digital camera 100 device in the OLAS 300 for use in the client, such as a browser.

FIG. 9 is a diagram for explaining association of a user and the digital camera 100 stored by the device ID registration function part 72 of the OLAS 300. A user who intends to use the OLAS 300 operates the mobile phone 200 or a PC to start the browser and accesses the OLAS 300 using the browser. In the example of FIG. 9, it is assumed that the mobile phone 200 is operated by the user, and some screens displayed on the mobile phone 200 at this time are illustrated.

After the OLAS 300 is accessed, the device ID registration function part 72 of the OLAS 300 transmits screen information to the browser of the mobile phone 200, and the browser of the mobile phone 200 displays a screen of a web page as shown in the upper part of FIG. 9 on the output device 37. In this screen of FIG. 9, an input column 101 of "registered user name" and an input column 102 of "password" are present and the user operates the input device 34 to input desired characters and numbers into the "registered user name" and "password" input columns, respectively.

When the user depresses the login button 103, the device ID registration function part 72 authenticates the user by the registered user name and the password received, accepts a user's login, and transmits the following screen information to the browser of the mobile phone 200, so that a screen of the web page as shown in the middle part of FIG. 9 is displayed on the output device 37. In the screen in the middle part of FIG. 9, a message 105 indicating "please input uploading device ID of a device which uploads an image to OO album", and an input column 106 of "uploading device ID", are present. The user operates the input device 34 to input the device ID of the digital camera 100 into the input column 106 of "uploading device ID".

Because the digital camera 100 transmits the device ID to the OLAS 300 at the time of uploading of image data, the OLAS 300 is able to identify the digital camera 100 and the user. In this case, the user may register two or more device IDs by one registered user name.

When the user depresses the "confirmation screen" button 107, the device ID registration function part 72 receives a user's button operation and transmits the following screen information to the browser of the mobile phone 200 so that a screen of the web page as shown in the lower part of FIG. 9 is displayed on the output device 37. In the screen in the lower part of FIG. 9, a message 108 indicating "The following information will be registered. Please press register button if no correction is needed. Please press correct button if correction is needed." and an association table 109 showing the contents of "registered user name" and "device ID" which the user has inputted are present.

If the user depresses the "register" button 110, the device ID registration function part 72 receives a user's button operation and registers the user information into the user information database 81. If the user depresses the "correct" button 111, the device ID registration function part 72 receives a user's button operation and transmits the screen information corresponding to the screen shown in the upper part of FIG. 9 to the browser of the mobile phone 200. In this case, the user can set up a "registered user name" and a "password" again.

FIG. 10 (*a*) is a diagram showing an example of the user information stored in the user information database 81. In the user information database 81, a "registered user name", a "password" and a "device ID", which the user has entered, are associated with a "user ID" and registered as the user information. A user ID is a user's identification code assigned by the device ID registration function part 72 such that no duplication of user ID occurs in the user information database 81. Each user may register a user's own address book (in which e-mail addresses of his friends or the like are registered) into the user information database 81.

Referring back to FIG. 8, the image receiving function part 73 receives the image data together with the device ID from the digital camera 100 via the WWW network 13 and stores the image data in the HDD 46 as the image data of the user specified by the device ID. Generally, image data belong to one or more albums, and the image receiving function part 73 registers the received image data into both the album management information database 82 and the image data database 83.

FIG. 10 (*b*) is a diagram showing an example of album management information stored in the album management information database 82. The album management information contains an "album ID", an "album name", an "album site ID", and an "album site attribute", which are associated with a user ID, and is registered in the album management information database 82.

The "album name" is initially set to an appropriate initial value (for example, the date it was uploaded) by the image receiving function part 73, and a user may change the "album name" to an arbitrary name later. It is assumed that image data belong to one of albums.

The "album ID" is the identifier for identifying an album to which the image data uploaded by the user belongs. The "album ID" is assigned by the image receiving function part 73 such that no duplication of album ID occurs in the image data database 83.

The "album site ID" is the identifier for identifying a web page in which the image data is published, and assigned by the image receiving function part 73. The "album site ID" contains a domain name of the OLAS 300 or an IP address of the OLAS 300 (for example, an IP address registered in a DNS server).

The "album site attribute" is the registered information which indicates whether all the image data belonging to the album are to be published, published to a particular person only (in this case, a user ID or an e-mail address of a publication site is also registered), or set in a non-published state. The image receiving function part 73 initially sets the "album site attribute" to a non-published state, but a user may change the "album site attribute" arbitrarily later.

FIG. 10 (*c*) is a diagram showing an example of image-data management information stored in the image data database 83. The image-data management information contains an "album ID", a "title", a "tag", an "attribute", and a "date of publication", which are associated with a "data ID", and is registered in the image data database 83.

The "data ID" is the identification information which is assigned by the image receiving function part 73 such that no duplication of data ID occurs in the image data database 83. The data ID is assigned each time the digital camera 100 uploads image data to the OLAS 300. The data ID may be a sequential image number or the like unless duplication occurs.

The "album ID" is the identification information for identifying an album to which the image data belongs. The "title" is a name of image data. The "title" is initially set to an appropriate initial value (for example, uploaded date) by the image receiving function part 73, and a user may change the "title" arbitrarily later.

The "tag" is the registered information indicating a photographing scene of image data (for example, a portrait, a sport scene, a scenic shot, a night view, etc). The image receiving function part 73 does not initially set the "tag" to a particular name, but a user may change the "tag" arbitrarily later. A tag of image data may be one of various information items including a photographing condition, a photographing date, etc., and any of these items may be a tag.

The "attribute" is the registered information which indicates whether image data of this data ID is to be published, published to a particular person only (in this case, a user ID or an e-mail address of a publication site is also registered), or set in a non-published state. The image receiving function part 73 initially sets the "attribute" to a non-published state, but a user may change the "attribute" arbitrarily later.

The "date of publication" is a date and time that the image data of this data ID was stored in the image data database 83, and the date and time is assigned by the image receiving function part 73. Not only a date and time of registration but also a date and time of photographing may be registered.

Referring back to FIG. 8, the personal album information transmitting function part 79 transmits personal album information generated from the management information of image data, to the mobile phone 200, as a response to the image data received by the image receiving function part 73, so that the mobile phone 200 can identify and access the image data stored in the OLAS 300. The personal album information will be described later with reference to FIG. 12.

The user management function part 74 provides functions, including generation of user account, editing of user information, and login authentication to the OLAS 300, for use in the client, such as a browser.

The viewer function part 75 provides a viewing function of image data stored in the OLAS 300 by a user, an online printing request function of the image data, etc. for use in the client, such as a browser.

The published information setting function part 76 provides a function to be called up if the client, such as a browser, accesses the OLAS 300 with URL information including a predetermined command ID, and receive from the user a setting of publication, limited publication, or non-published state of the user's image data stored in the OLAS 300.

The invitation sending function part 77 provides a function to be called up if the client, such as a browser, accesses the OLAS 300 with the URL information including a predetermined command ID, and transmit an invitation including an accessing method for the image data by e-mail. An invited person who has received the invitation from the OLAS 300 can search the user's image data stored in the OLAS 300.

The image information setting function part 78 provides a function to be called up if the client, such as a browser, accesses the OLAS 300 with the URL information including predetermined command ID, and receives from the user editing of a title of the user's image data stored in the OLAS 300, a tag for searching, or an album name or an album to which the image data belongs, for use in the client. The image information setting function part 78 further provides a function to receive a setting of the album name and the album site attribute (general publication, limited publication, non-published state) from the user.

Figure 11:
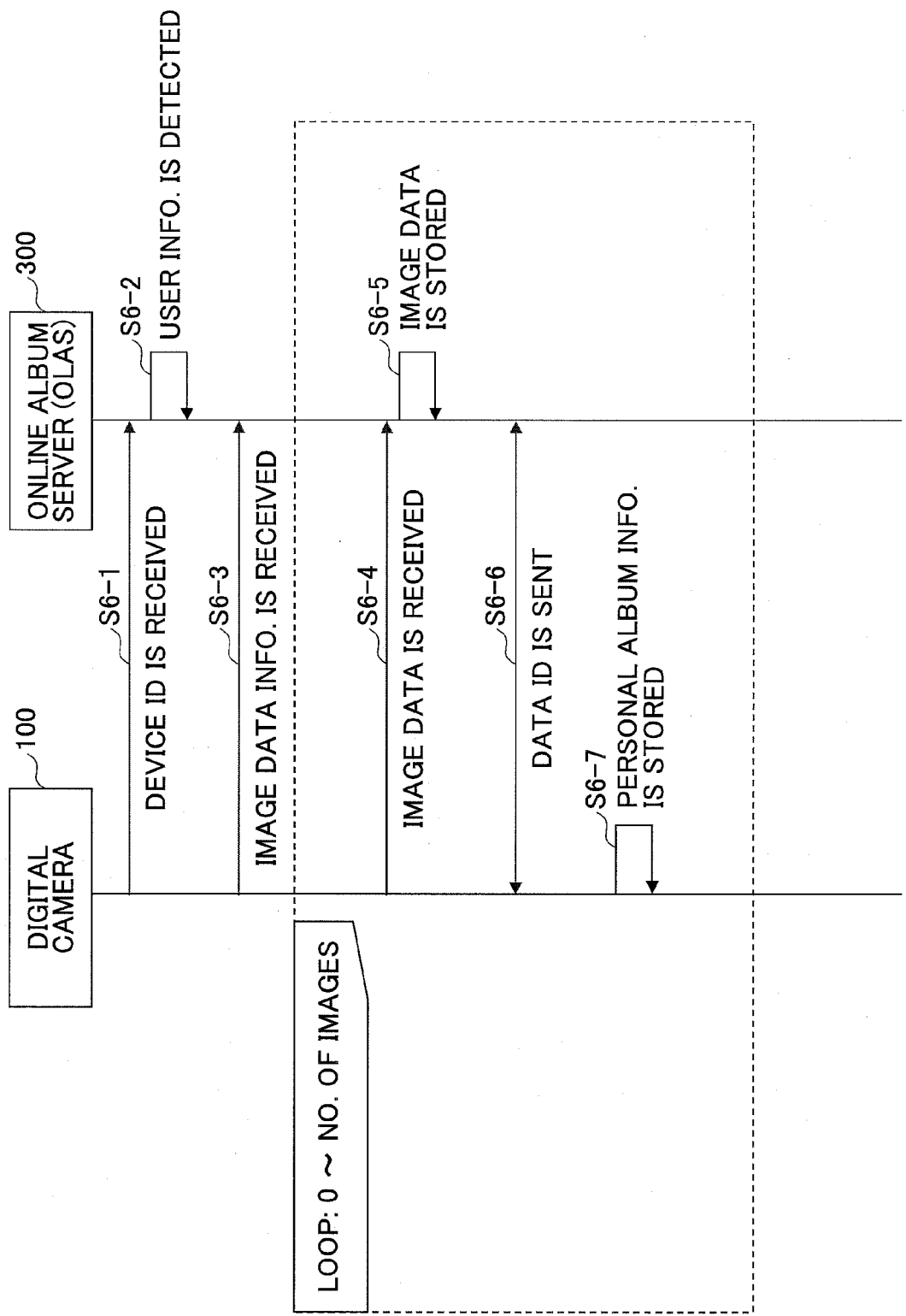
FIG. 11 is a sequence diagram for explaining a process of receiving image data from the digital camera performed by an image receiving function part of the OLAS.

FIG. 11 is a sequence diagram for explaining a process of receiving image data from the digital camera 100 by the image receiving function part 73. This process is automatically started when the digital camera 100 accesses the access point. It is assumed that image data to be transmitted to the OLAS 300 is already specified by a user from among the image data stored in the image storage part 23, or the non-uploaded image data in the digital camera 100 is to be transmitted automatically.

When the wireless network adapter part 24 detects the access point, the image uploading function part 52 transmits the device ID to the OLAS 300 (S6-1). The device ID is stored at a predetermined address in the image storage part 23 or the ROM (not illustrated). The device ID is the identification information for identifying the user, and the device ID may be any information that can identify the user, such as a user ID.

The user management function part 74 of the OLAS 300 identifies the user information associated with the device ID, received from the digital camera 100, in the user information database 81 (S6-2).

The image uploading function part 52 of the digital camera 100 transmits the image-data information of the image data to be transmitted from the digital camera 100, to the OLAS 300 (S6-3). The image-data information contains the number of images of the image data transmitted from the digital camera 100 to the OLAS 300, a data size of each image data, and a tag of each image data.

The following process of steps S6-4 to S6-7 is repeatedly performed by the image uploading function part 52 and the personal album information recording function part 54 for the number of images of the image data transmitted.

First, the image uploading function part 52 transmits one image of the image data of the image storage part 23 to the OLAS 300 (S6-4).

The image receiving function part 73 of the OLAS 300 registers the received image data into the image data database 83, and registers the album management information of the album to which the image data belongs into the album information management database 82 (S6-5). Specifically, the image receiving function part 73 sets up appropriate initial values for the album ID, the album name, the album site ID, and the album site attribute which are associated with the user ID. The image receiving function part 73 generates a new data ID, associates the album ID with the data ID, and sets up appropriate initial values for the title, the tag, the attribute, and the date of publication which are associated with the data ID.

The image receiving function part 73 transmits the data ID of the image data to the digital camera 100 as an HTTP response to an HTTP request by which the digital camera 100 has transmitted the image data (S6-6). At this time, the user ID, the album ID, the album site ID, the album name, and the album site attribute are also transmitted together with the data ID.

The personal album information recording function part 54 generates personal album information based on the received user ID and others and records the personal album information in a header of the image data stored in the image storage part 23 of the digital camera 100 (S6-7).

FIG. 12 is a diagram showing an example of the personal album information. The personal album information contains an "attribute", a "user ID", an "album ID", an "album name", a "data ID", an "album site ID", and an "album site attribute".

The "attribute" is the information which indicates whether the image data has been uploaded to the OLAS 300, and this information is assigned by the personal album information recording function part 54. The "user ID", the "album ID", the "album name", the "data ID", the "album site ID", and the "album site attribute" are information items transmitted from the OLAS 300 to the digital camera 100.

After the process of steps S6-4 to S6-7 is repeatedly performed by the image uploading function part 52 and the personal album information recording function part 54, all the images of the image data are transmitted to the OLAS 300 and the personal album information is registered into the header of each image data of the image storage part 23.

Figure 13:
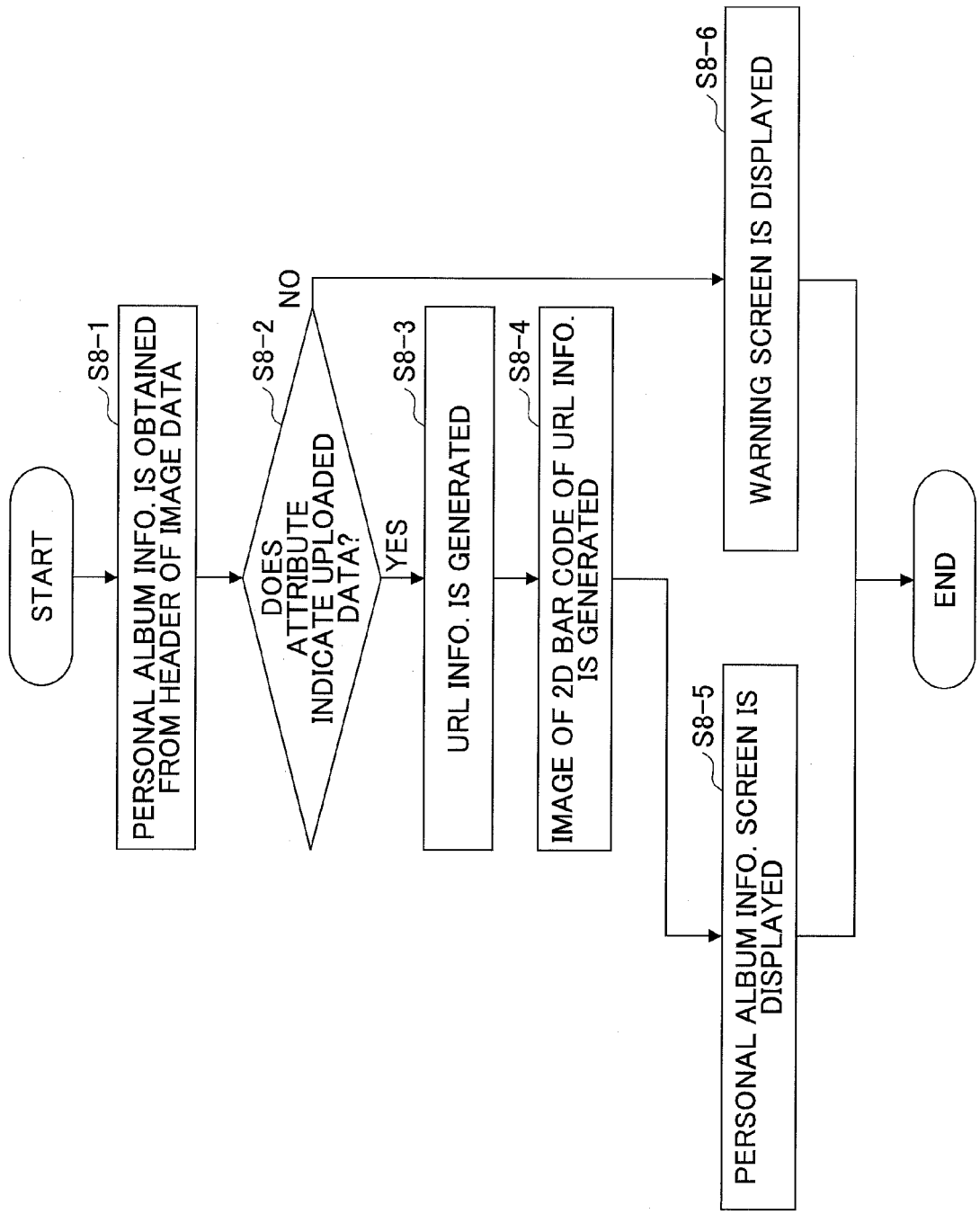
FIG. 13 is a flowchart for explaining a process in which the digital camera displays personal album information on a display part.

FIG. 13 is a flowchart for explaining a process in which the digital camera 100 displays the personal album information on the display part 21.

Initially, a user operates the button input control part 25 to display image data on the display part 21. The playback function part 53 reads the image data specified by the user from the image storage part 23 and displays the image data on the display part 21.

Figure 14:
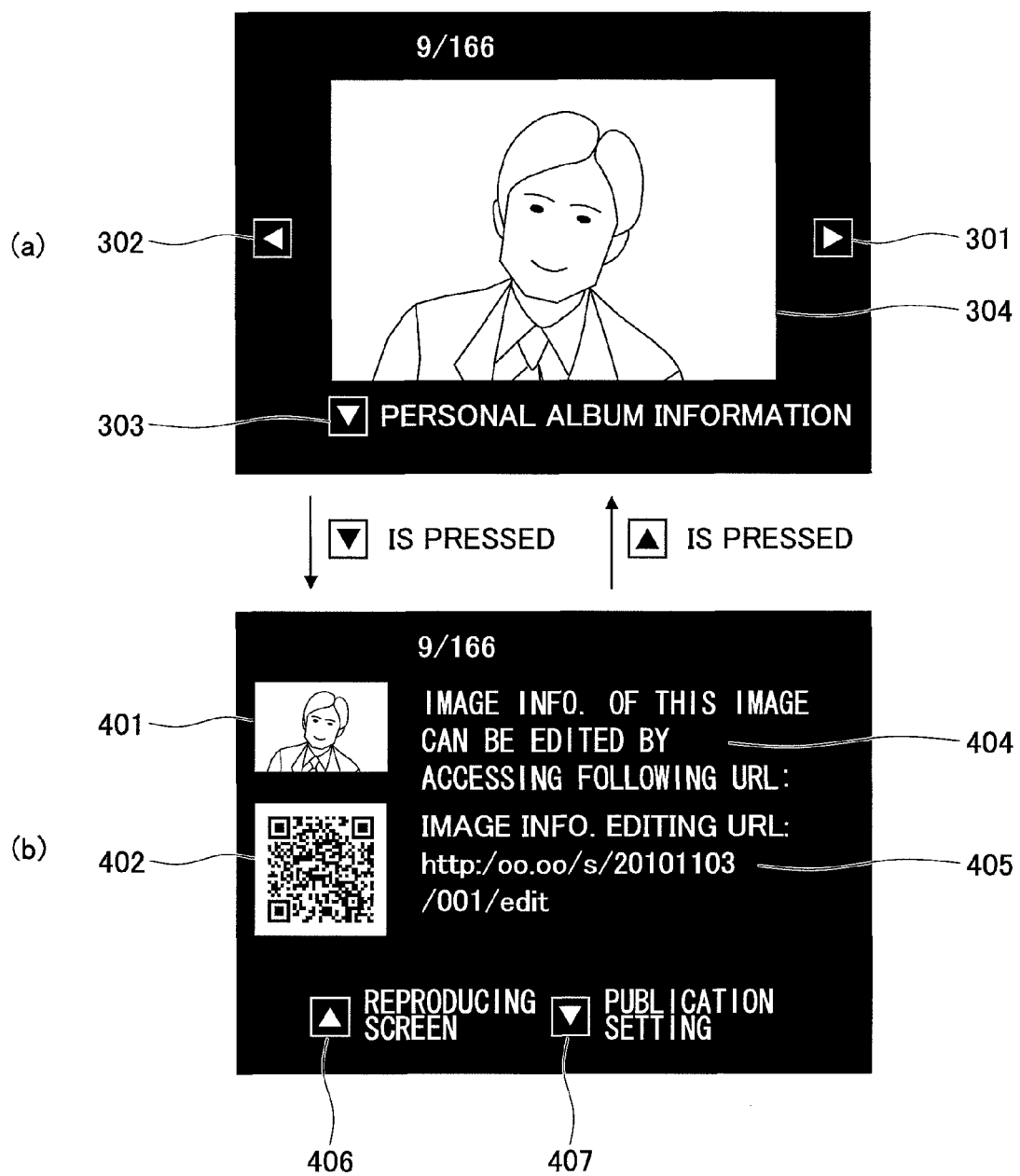
FIG. 14 is a diagram showing an example of an image-data display screen.

FIG. 14 (a) is a diagram showing an image-data display screen displayed on the display part 21. In the image-data display screen, arrow buttons 301-303 and image data 304 are present. If the user depresses the arrow button 301, the playback function part 53 displays the following image data (10/166) captured after the current image data (9/166) on the display part 21. If the user depresses the arrow button 302, the playback function part 53 displays the preceding image data (8/166) captured before the current image data (9/166) on the display part 21. If the user depresses the arrow button 303, the process shown in FIG. 13 will be performed.

As shown in FIG. 13, the playback function part 53 obtains the personal album information from the header of the currently displayed image data (S8-1). The personal album information is not generated unless the image data is uploaded to the OLAS 300.

The playback function part 53 determines whether the "attribute" of the personal album information indicates that the image data has been uploaded to the OLAS 300, in order to determine whether the personal album information is stored in the header of the image data (S8-2).

When the "attribute" of the personal album information indicates that the image data has been uploaded to the OLAS 300 (Yes of S8-2), the URL information generating part 551 generates URL information for editing the management information of the OLAS 300 (S8-3).

Figure 15:
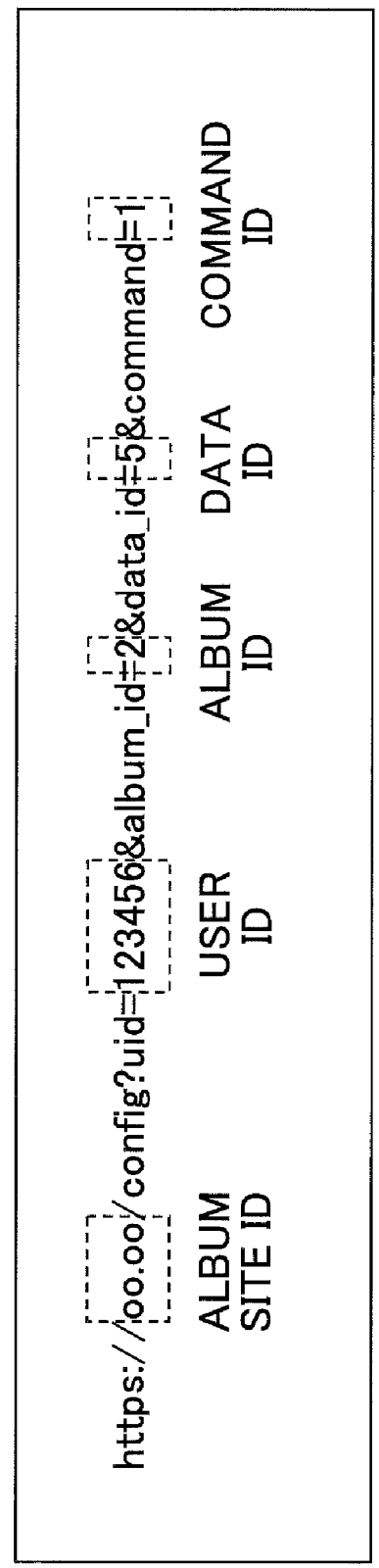
FIG. 15 is a diagram for explaining generation of URL information for editing management information.

FIG. 15 is a diagram for explaining generation of URL information for editing management information. This URL information is generated as character string information based on the personal album information.

As indicated by the dashed lines in FIG. 15, "oo_oo" extracted from the left portion of the character string information (the URL information) "https://oo.oo/config?uid=123456&album_id=2&data_id=5 &command=1" indicates the album site ID, "uid=123456" indicates the user ID, "album_id=2" indicates the album ID, "data_id=5" indicates the data ID, and "command=1" indicates the command ID. The command ID will be described later. In this manner, the URL information generating part 551 generates the URL information for editing management information, by extracting each information item from the character string information of the personal album information in a predetermined sequence.

The OLAS 300 can identify the user ID by reading the contents of the databases 81-83 by the data ID contained in the URL information. However, the user ID is contained in the URL information, and the OLAS 300 can authenticate the digital camera 100 or the user in a simplified manner. Also, in a case in which one image data belongs to two or more albums, the album ID is contained in the URL information, and a target album for editing the management information can be uniquely identified by the OLAS 300.

Referring back to FIG. 13, the encoding part 552 generates a two-dimensional bar code based on the generated URL information (S8-4).

The playback function part 53 generates a personal album information screen using the two-dimensional bar code and displays the personal album information screen on the display part 21 (S8-5).

FIG. 14 (b) is a diagram showing an example of the personal album information screen displayed on the display part 21. In the personal album information screen, a reduced image-data (thumbnail) 401, a two-dimensional bar code 402, an album name 404, an image information editing URL 405, and arrow buttons 406 and 407 are present.

By causing the mobile phone 200 to capture an image of the personal album information screen containing the two-dimensional bar code, the mobile phone 200 is allowed to access the URL for editing the management information, and the user can edit the management information of the image data. This process will be described later.

On the other hand, in the step S8-2 of the process of FIG. 13, when the "attribute" of the personal album information does not indicate that the image data has been uploaded (No of S8-2), the playback function part 53 displays a warning screen on the display part 21 (S8-6).

Figure 16:
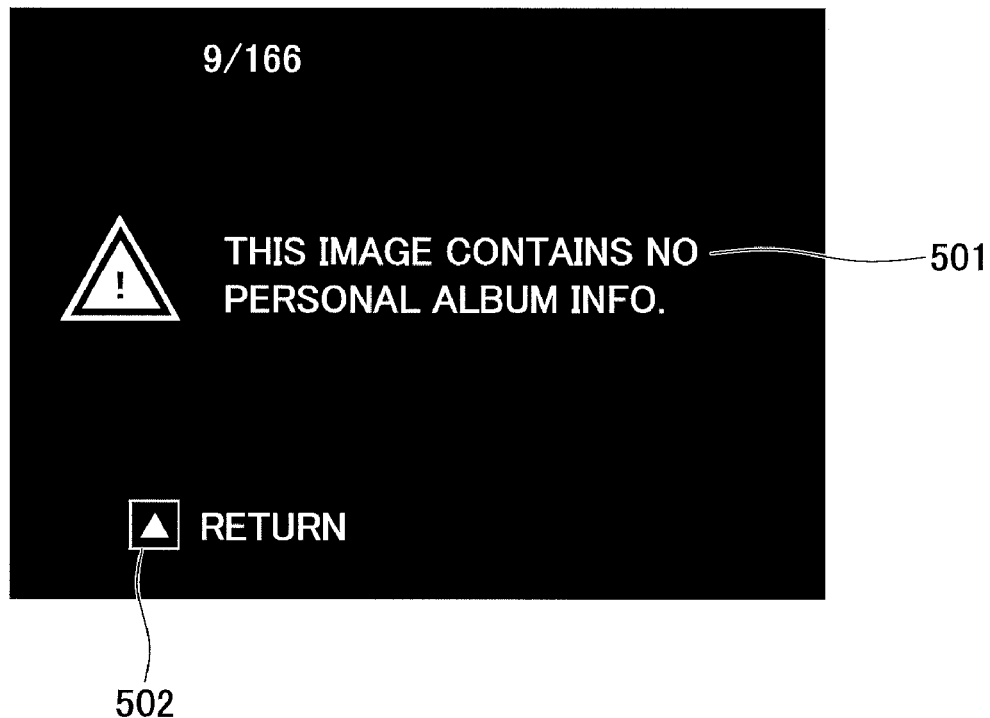
FIG. 16 is a diagram showing an example of a warning screen.

FIG. 16 is a diagram showing an example of the warning screen. In this warning screen, a message 501 indicating "this image contains no personal album information" and an arrow button 502 are present. Viewing the message 501, the user can grasp that the image data has not yet been uploaded. If the user depresses the arrow button 502, the playback function part 53 displays the image-data display screen of FIG. 14 (a) on the display part 21.

Next, the command ID described in the URL information for editing the management information will be described.

The URL information differs if the command ID differs. Hence, the command ID makes it possible to vary the URL information which is accessed by the mobile phone 200. Namely, the OLAS 300 transmits to the mobile phone 200 the screen information of the web page in which the content of manipulation to the management information is varied according to the command ID. If the user selects a suitable command on the digital camera 100, the user is allowed to directly access the URL in which the user can perform a desired manipulation to the management information.

FIG. 17 is a diagram showing a correspondence table of a command ID, a command, and the content of the manipulation. The digital camera 100 stores the correspondence table and causes the playback function part 53 to read the content of the correspondence table.

As shown in FIG. 17, the command with the command ID=1 is "edit", and the mobile phone 200 is caused to access the URL in which the user alters a title of the image data, a tag of the image data, an album to which the image data belongs, or an album name of the album.

The command with the command ID=2 is "acl", and the mobile phone 200 is caused to access the URL in which the user sets the publication of the image data.

The command with the command ID=3 is "inv", and the mobile phone 200 is caused to access the URL in which the user sets an e-mail address of a destination to which the OLAS 300 sends an invitation to the image data.

The command with the command ID=4 is "edit_a", and the mobile phone 200 is caused to access the URL in which the user alters an album name or an album site attribute.

The command with the command ID=5 is "inv_a", and the mobile phone 200 is caused to access the URL in which the user sets an e-mail address of a destination to which the OLAS 300 sends an invitation to the album in which the image data is registered.

The command with the command ID=6 is "delete", and the mobile phone 200 is caused to access the URL in which the user deletes the image data stored in the image data database 83.

FIG. 18 is a diagram for explaining operation of a user to select a command (URL). It is not necessary that the user pays attention to the command or the command ID. FIG. 18 (a) shows the personal album information screen which is the same as shown in FIG. 14 (b). If the user depresses the arrow button 407, the URL information generating part 551 reads the command IDs in the correspondence table of FIG. 17 in a descending order, for example, and writes "2" to the "command=" part of the URL information for editing the management information. Subsequently, the encoding part 552 generates a two-dimensional bar code based on the URL information. After the two-dimensional bar code is generated, the personal album information displaying function part 55 displays a personal album information screen as shown in FIG. 18 (b), through a predetermined screen transition.

In the personal album information screen of FIG. 18 (b), a reduced image data (thumbnail) 601, a two-dimensional bar code 602, a message 603 indicating "publication setting of this image can be made by accessing the following URL", a publication setting URL 604, and arrow buttons 605 and 606 are present. If the user depresses the arrow button 606, the URL information generating part 551 writes "3" to the "command=" part of the URL information for editing the management information. Subsequently, the encoding part 552 generates a two-dimensional bar code based on the URL information. After the two-dimensional bar code is generated, a personal album information screen as shown in FIG. 18 (*c*) is displayed through a predetermined screen transition.

On the other hand, if the user depresses the arrow button 605, the personal album information screen of FIG. 18 (*a*) is displayed again.

In the personal album information screen of FIG. 18 (*c*), a reduced image data (thumbnail) 701, a two-dimensional bar code 702, a message 703 indicating "an invitation to this image can be sent by accessing the following URL", an information editing URL 704, and arrow buttons 705 and 706 are present. If the user depresses the arrow button 706, a personal album information screen is displayed for connecting to the URL in which another content of the manipulation is allowed.

Accordingly, the user operates the digital camera 100 to specify the desired manipulation in accordance with the guidance message, and the mobile phone 200 is allowed to access the URL in which the specified manipulation can be performed.

After the mobile phone 200 captures an image of one of the personal album information screens of FIG. 18 (*a*)-(*c*), the user is allowed to access the OLAS 300 using the mobile phone 200, so that the user can edit the management information.

Figure 19:
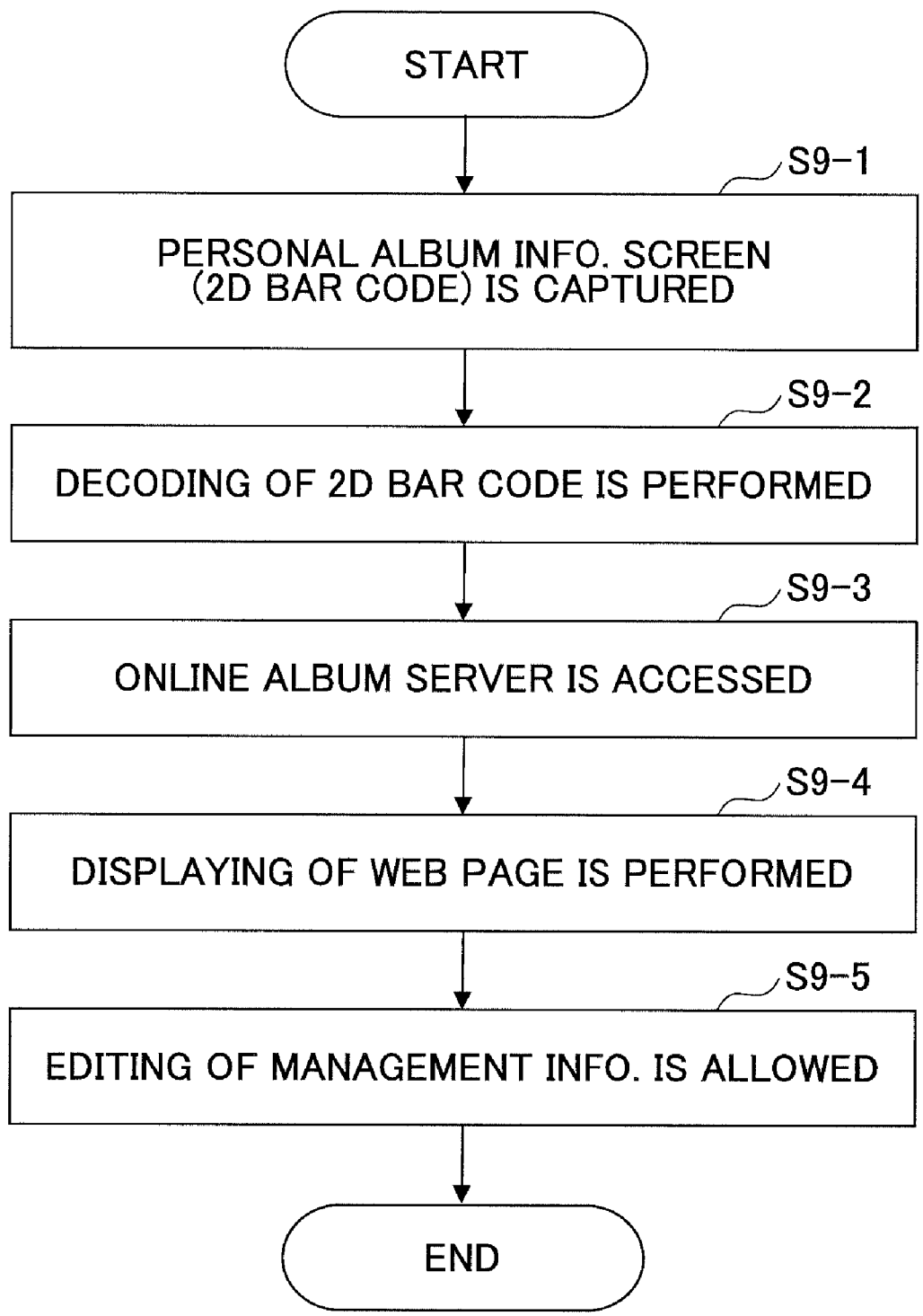
FIG. 19 is a flowchart for explaining a process in which the mobile phone accesses the online album server (OLAS).

FIG. 19 is a flowchart for explaining a process in which the mobile phone 200 accesses the OLAS 300.

As shown in FIG. 19, the user sets the mobile phone 200 in the bar code photographing mode and causes the bar code photographing part 62 to capture an image of the personal album information screen (two-dimensional bar code) on the digital camera 100 (S9-1).

The decoding part 63 decodes the captured two-dimensional bar code (S9-2). Thereby, the decoding part 63 displays the URL information for editing the management information on the output device 37, and the user is prompted to access the OLAS 300 using the URL.

If the user operates the input device 34 to input the operation to access the OLAS 300, the browser executing part 61 accesses the OLAS 300 using the URL and transmits an HTTP request to the OLAS 300 (S9-3).

For example, when the mobile phone 200 accesses the OLAS 300 using the URL information including the command ID=1 (edit) described, the image information setting function part 78 transmits the screen information described in HTML to the mobile phone 200 as an HTTP response. Namely, the image information setting function part 78 identifies the image data registered in the image data database 83 with the data ID corresponding to the "data_id" of "https://oo.oo/config?uid=123456&album_id=2&data_id=1 &command=1". The image information setting function part 78 reads the titles, the album names (including all the album names associated with the user ID), and the tags which are associated with the data ID, and generates the screen information.

When the mobile phone 200 accesses the OLAS 300 using the URL information including the command ID=2 (acl) described, the published information setting function part 76 transmits the screen information described in HTML to the mobile phone 200 as a HTTP response. Namely, the published information setting function part 76 identifies the image data registered in the image data database 83 with the data ID corresponding to the "data_id", reads the publication attribute associated with the data ID, and generates the screen information.

Similarly, when the mobile phone 200 accesses the OLAS 300 using the URL information including the command ID=3 (inv) described, the invitation sending function part 77 transmits the screen information described in HTML to the mobile phone 200 as an HTTP response. Namely, the invitation sending function part 77 identifies the user information registered in the user information database 81 with the user ID corresponding to the "uid=", reads the address book with the user ID, and generates the screen information. In the address book, the e-mail addresses of the user's friends are registered beforehand.

The browser executing part 61 interprets each screen information and displays the image of the web page on the output device 37 (S9-4).

Accordingly, the user is allowed to edit the management information using the web page image displayed (S9-5).

Figure 20:
FIG. 20 is a diagram showing an example of a web page image displayed on the mobile phone based on the screen information transmitted by an image information setting function part of the OLAS.

FIG. 20 is a diagram showing an example of a web page image displayed on the mobile phone 200 based on the screen information transmitted by the image information setting function part 78. In this web page image, a title column 1101 of the image, an album name column 1102, a tag setting column 1103, a new album button 1104, an addition button 1105, a location information adding column 1106, an OK button 1107, and a cancel button 1108 are present.

As shown in FIG. 20, the title of the image is displayed in the title column 1101, the album name is displayed in the album name column 1102, and the tag is displayed in the tag setting column 1103, respectively. The user can operate the input device 34 to edit the title of the image in the title column 1101.

If the user clicks the pull-down menu key on the right-hand side of the album name column 1102, an album name of an album which is managed by the user is displayed and the user can alter the album which the currently viewed image data belongs to by selecting the album name in the pull-down menu. If the user depresses the new album button 1104, the user can generate a new album in the OLAS 300 and can register the currently viewed image data into the new album.

If the user clicks the pull-down menu key on the right-hand side of the tag setting column 1103, list of candidate tags is displayed and the user can alter the tag of the currently viewed image data by selecting a tag in the list of candidate tags in the pull-down menu. If the user depresses the addition button 1105, the user can add the tag to the currently viewed image data.

If the user inserts a check mark into the location information adding column 1106, the browser executing part 61 acquires location information from the GNSS (global navigation satellite system) and transmits the location information to the OLAS 300. Hence, the OLAS 300 can add the location information of the present location of the mobile phone 200 to the image data.

If the user depresses the OK button 1107, the contents of the image information having been edited by the user are transmitted to the OLAS 300. If the user depresses the cancel button 1108, the contents of the image information currently displayed are canceled. The image information setting function part 78 of the OLAS 300 updates the image data database 83 and the album management information database 82 using the title, the album name and the tag of the received image information.

Figure 21:
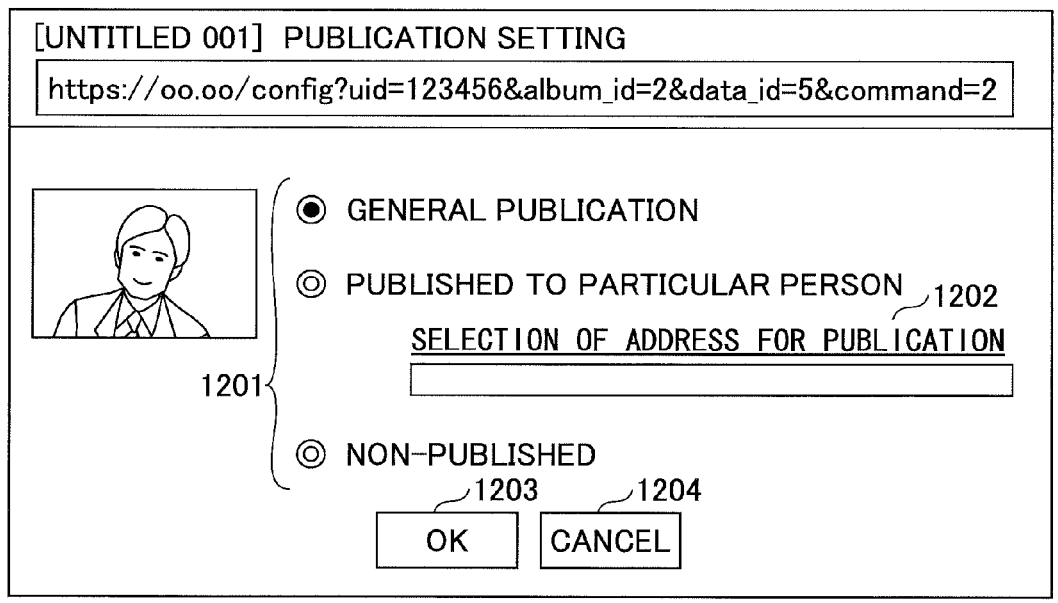
FIG. 21 is a diagram showing an example of a web page image displayed based on the screen information transmitted by a published information setting function part of the OLAS.

FIG. 21 is a diagram showing an example of a web page image displayed based on the screen information transmitted by the published information setting function part 76. In this web page image, published information setting buttons 1201, a publication address selecting menu bar 1202, an OK button 1203, and a cancel button 1204 are present.

If the user clicks one of the published information setting buttons 1201, the user can select one of "general publication", "published to particular person" and "non-published" options for the published information setting. If the user depresses the publication address selecting menu bar 1202, the browser executing part 61 acquires the user's address book from the OLAS 300 and displays a list of user names of the address book. The user can published the image data to a particular person by selecting a user name (equivalent to selection of a user ID) in the user name list of the address book. The user name selected by the user is displayed in the column below the publication address selecting menu bar 1202.

If the user depresses the OK button 1203, the contents of the publication setting information having been edited by the user are transmitted to the OLAS 300. If the user depresses the cancel button 1204, the contents of the publication setting information currently displayed are canceled. The published information setting function part 76 of the OLAS 300 changes the publication information (attribute) of the image data database 83 according to the contents of the received publication setting information.

When the mobile phone 200 accesses the OLAS 300 using the URL information including the command ID=4 (edit_a) described, the published information setting function part 76 of the OLAS 300 is allowed to edit the album information, such as an album name. The published information setting function part 76 transmits the screen information for displaying the publication address selecting menu bar 1202 of the album, to the mobile phone 200.

FIG. 22 (*a*) is a diagram showing an example of a web page image displayed on the mobile phone 200 based on the screen information transmitted by the invitation sending function part 77. In this web page image, a message 1301 indicating "sending an invitation to this image is possible and please select a transmission destination", an address display column 1302, an address book button 1303, an OK button 1304, and a cancel button 1305 are present.

If the user views this message and depresses the address book button 1303, the browser executing part 61 interprets the script language of JavaScript, and displays a list of e-mail addresses of the user's address book. The user can select the destination address for sending the invitation by pressing the e-mail address or the user ID in the address book. The e-mail address or the user ID selected by the user is displayed in the address display column 1302. Alternatively, the user may input an e-mail address or a user ID directly to the address display column 1302.

If the user depresses the OK button 1304, the contents of the invitation sending information having been edited by the user are transmitted to the OLAS 300. If the user depresses the cancel button 1305, the contents of the invitation sending information currently displayed are canceled.

The invitation sending function part 77 of the OLAS 300 requests the viewer function part 75 to generate the screen information and the URL information for the viewing of the image data specified by the data ID. The invitation sending function part 77 describes the URL for the viewing of the image data in the invitation and transmits the invitation by e-mail using the destination address received from the mobile phone 200.

When the mobile phone 200 accesses the OLAS 300 using the URL information including the command ID=5 (inv_a), the invitation sending function part 77 transmits to the mobile phone 200 the screen information which enables transmission of an invitation to the album to which the image data belongs to an invited person.

FIG. 22 (*b*) is a diagram showing an example of an invitation to image data transmitted to an invited person. In this example, a URL 1306 for viewing of the image data is displayed together with a "sender name", a "destination address" and a "subject name".

If the invited person accesses the URL 1306 for the viewing, the invited person can search the image data specified by the data ID.

On the other hand, if the invited person operates a PC to access the OLAS 300, the viewer function part 75 of the OLAS 300 transmits the screen information generated at the time of generating the URL information for viewing of the image data, to the PC operated by the invited person.

FIG. 23 is a diagram showing an example of a web page image displayed by a browser of a PC which is operated by an invited person. In this web page image, image data 1401 which is intended by the user to show to the invited person is present. Further, a print button 1402 is displayed in the web page image at the lower part of the image data 1401, and the invited person can request printing of the image data on a printing sheet to the OLAS 300 by depressing the print button 1402.

As described above, in the foregoing embodiment, the OLAS 300 transmits the personal album information of image data to the digital camera 100, and the mobile phone 200 obtains the personal album information from the digital camera 100 and captures the two-dimensional bar code, so that the user is allowed to access the OLAS 300 even if the user does not input the URL. Therefore, the user can edit the title, publication setting, etc. of the image data of the OLAS 300 more easily than the uploading function according to the related art. Further, the user can easily transmit an invitation regarding the image data to an invited person.

Further, in the foregoing embodiment, the content of the manipulation is specified by the command ID, the command ID is included in the URL information generated by the digital camera 100, and the user is allowed to perform the desired manipulation to the management information in the web page image directly without searching around the hierarchical data of the web page image after the online album server 300 is accessed. It is possible to provide increased workability for the user.

Further, it is not necessary to incorporate the image analysis part for reading a two-dimensional bar code in the digital camera 100, and the foregoing embodiment can provide a photographing device having the improved uploading function with low cost.

As described in the foregoing, the present disclosure provides a photographing device which can easily upload image data to an online album server using a wireless communication function, and can easily set up management information of the image data.

The present disclosure is not limited to the specifically disclosed embodiments, and variations and modifications may be made without departing from the scope of the present disclosure.

The present application is based upon and claims the benefit of priority of Japanese patent application No. 2011-018943, filed on Jan. 31, 2011, the contents of which are incorporated herein by reference in their entirety.

What is claimed is:

1. An album system comprising:
a server; and a photographing device which transmits image data to the server via a network, the server comprising:
an image data storing unit;
a user information storing unit configured to store a user identifier to identify a user;
an image-data receiving unit configured to identify the user by the user identifier received from the photographing device, associate image data received from the photographing device with the user identifier, and store the image data in the image data storing unit; and
a data transmitting unit configured to assign a data identifier to identify the image data to the image data stored in the image data storing unit and transmit the data identifier to the photographing device, the photographing device comprising:
an information uploading unit configured to transmit the user identifier and the image data to the server;
an image information storing unit configured to receive the data identifier from the server, associate the image data with the data identifier, and store the image data in a non-volatile memory or a removable non-volatile memory of the photographing device;
a URL information generating unit configured to generate URL information of a web page containing the data identifier and requesting the server to manipulate management information of the image data;
an encoding unit configured to encode the URL information into a bar code; and
a display unit configured to display an image of the bar code on a display.

2. A photographing device which is arranged to communicate with a server via a network, the server including an image data storing unit, a user information storing unit which stores a user identifier to identify a user, an image-data receiving unit which identifies the user by the user identifier received from the photographing device, associates image data received from the photographing device with the user identifier, and stores the image data in the image data storing unit, and a data transmitting unit which assigns a data identifier to identify the image data to the image data stored in the image data storing unit and transmits the data identifier to the photographing device, the photographing device comprising:
an information uploading unit configured to transmit the user identifier and the image data to the server;
an image information storing unit configured to receive the data identifier from the server, associate the image data with the data identifier, and store the image data in a non-volatile memory or a removable non-volatile memory of the photographing device;
a URL information generating unit configured to generate URL information of a web page containing the data identifier and requesting the server to manipulate management information of the image data;
an encoding unit configured to encode the URL information into a bar code; and
a display unit configured to display an image of the bar code on a display.

3. The photographing device according to claim 2, wherein the URL information generating unit is configured to receive a command identifier to identify a content of the manipulation to the management information, and the URL information generating unit generates the URL information containing the received command identifier.

4. The photographing device according to claim 2, wherein the image information storing unit is arranged to receive from the server an album identifier to identify an album to which the image data belongs, associate the image data with the data identifier and the album identifier, and store the image data therein, and
the URL information generating unit generates the URL information containing the data identifier and the album identifier and requesting the server to manipulate the management information.

5. The photographing device according to claim 3, wherein the content of the manipulation is setting of a destination e-mail address of the URL information for viewing of the image data or the image data belonging to the album.

6. The photographing device according to claim 2, wherein the image data storing unit is arranged to store the management information including a title name of the image data, an album name of an album to which the image data belongs, and a tag of the image data, which are associated with the data identifier, and the content of the manipulation is editing of the title name of the image data, the album name of the album to which the image data belongs, or the tag of the image data.

7. The photographing device according to claim 2, wherein the image data storing unit is arranged to store the management information including publication setting of the image data and a specific publication site of limited publication of the image data, which are associated with the data identifier, and the content of the manipulation is one of changing of the publication setting and changing of the specific publication site.

8. The photographing device according to claim 4, wherein the image data storing unit is arranged to store the management information including an album name of the album, publication setting of the image data belonging to the album, and a specific publication site of limited publication of the image data, which are associated with the data identifier, and
the content of the manipulation is one of editing of the album name, changing of the publication setting of the image data belonging to the album, and changing of the specific publication site.

9. A server arranged to communicate with a photographing device via a network, the photographing device including an information uploading unit which transmits image data and a user identifier to identify a user to the server, an image information storing unit which receives a data identifier from the server, associates the image data with the data identifier, and stores the image data in a non-volatile memory or a removable non-volatile memory of the photographing device, a URL information generating unit which generates URL information of a web page containing the data identifier and requesting the server to manipulate management information of the image data, an encoding unit which encodes the URL information into a bar code, and a display unit which displays an image of the bar code on a display, the server comprising:
an image data storing unit;
a user information storing unit configured to store the user identifier;
an image-data receiving unit configured to identify the user by the user identifier received from the photographing device, associate the image data received from the photographing device with the user identifier, and store the image data in the image data storing unit; and
a data transmitting unit configured to assign a data identifier to identify the image data to the image data stored in the image data storing unit, and transmit the data identifier to the photographing device.

* * * * *